(12) United States Patent
Cheon et al.

(10) Patent No.: US 12,288,571 B2
(45) Date of Patent: Apr. 29, 2025

(54) RETENTION STRUCTURES AND SYSTEMS FOR RECORD OR VINYL PLAYBACK DEVICES OR SYSTEMS

(71) Applicant: Koolance, Inc., Auburn, WA (US)

(72) Inventors: Kioan Cheon, Auburn, WA (US); Ankuk Song, Anyang-si (KR)

(73) Assignee: Koolance, Inc., Auburn, WA (US)

( * ) Notice: Subject to any disclaimer, the term of this patent is extended or adjusted under 35 U.S.C. 154(b) by 0 days.

(21) Appl. No.: 18/357,009

(22) Filed: Jul. 21, 2023

(65) Prior Publication Data

US 2024/0038259 A1    Feb. 1, 2024

Related U.S. Application Data

(60) Provisional application No. 63/393,157, filed on Jul. 28, 2022.

(51) Int. Cl.
G11B 3/60 (2006.01)

(52) U.S. Cl.
CPC ..................... G11B 3/60 (2013.01)

(58) Field of Classification Search
None
See application file for complete search history.

(56) References Cited

U.S. PATENT DOCUMENTS

| | | | |
|---|---|---|---|
| 1,904,490 A | 4/1933 | Mallina | |
| 2,937,916 A | 5/1960 | Hohnecker | |
| 2,979,336 A | 4/1961 | Ristau et al. | |
| 3,608,909 A | * 9/1971 | Rabinow | G11B 17/0282 |
| 3,871,663 A | 3/1975 | Stave | |
| 4,332,025 A | 5/1982 | Thurston | |
| 4,356,594 A | * 11/1982 | Grosemans | E05F 3/20 16/256 |
| 4,437,178 A | * 3/1984 | Miyoshi | G11B 17/12 |

FOREIGN PATENT DOCUMENTS

| | | | | |
|---|---|---|---|---|
| FR | 2514543 A1 | * | 4/1983 | |
| FR | 2553221 A | * | 4/1985 | ........... G11B 17/028 |
| JP | 52146603 A | * | 12/1977 | |

* cited by examiner

*Primary Examiner* — William J Klimowicz
(74) *Attorney, Agent, or Firm* — Seed IP Law Group LLP

(57) ABSTRACT

In at least one embodiment, a record or vinyl playback device includes a spindle clamp at a central region of the playback device and a peripheral clamp at a peripheral region of the playback device. In operation, the spindle clamp is inserted into an opening at a center of a record to be played utilizing the playback device. Once the record is present on the playback device, the spindle clamp is actuated to mechanically engage one or more spindle clamp arms with a central region or surface of the record, and the peripheral clamp is actuated to mechanically engage one or more clamp structures with a peripheral region or surface of the record. The spindle clamp arms may rotate inward and outward from a shaft of the spindle clamp, and the clamp structures may translate inward and outward from a center of the record.

13 Claims, 15 Drawing Sheets

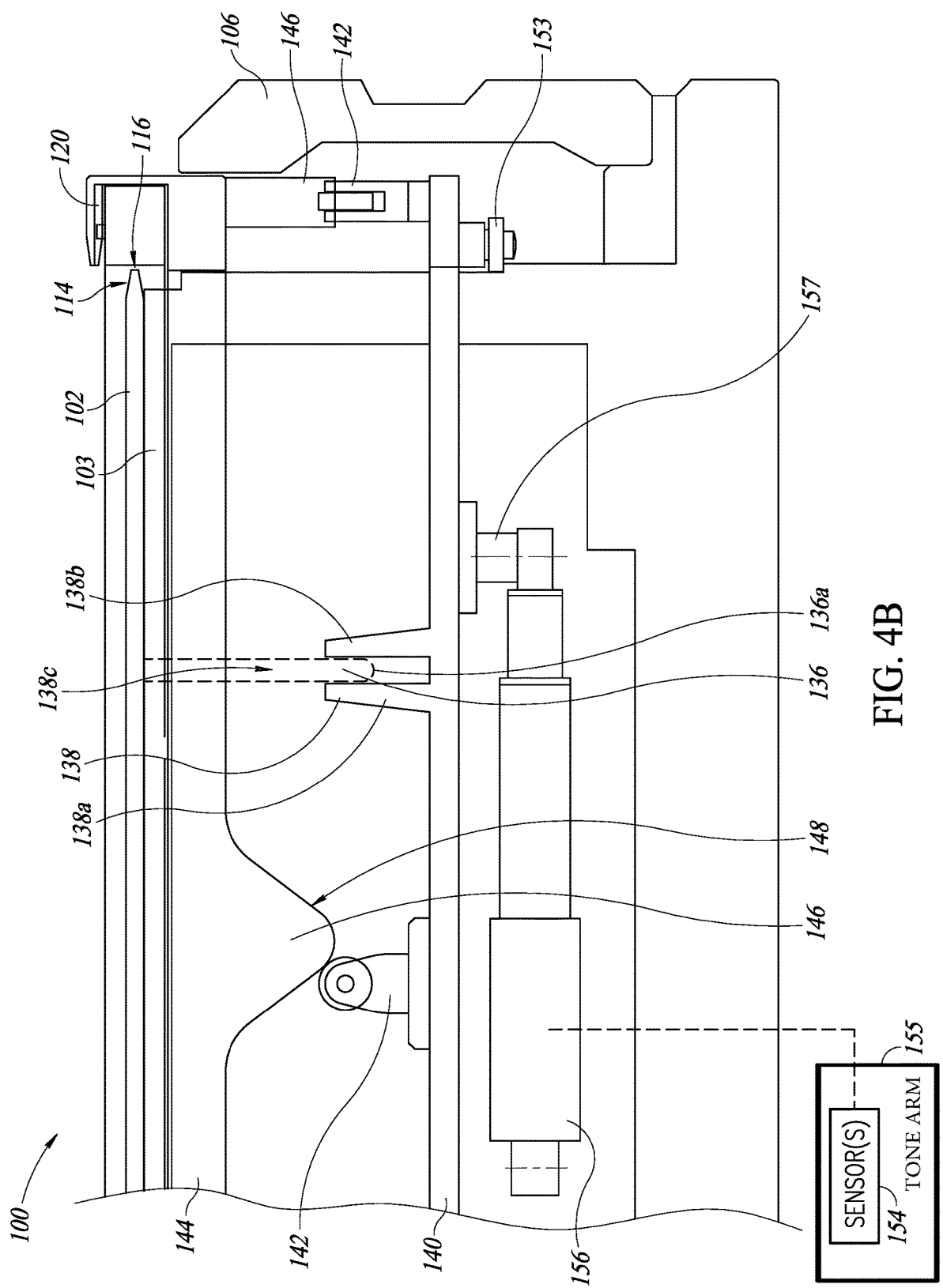

RETENTION STRUCTURES AND SYSTEMS FOR RECORD OR VINYL PLAYBACK DEVICES OR SYSTEMS

BACKGROUND

Technical Field

The present disclosure is directed to retention structures and systems for a record or vinyl playback device (e.g., a record or vinyl player, a turntable, a phonograph, etc.), for example, to hold a record in place on the record or vinyl playback device.

Description of the Related Art

Generally, in a conventional record player, a spindle is at a center of a record platter on which a record or vinyl is positioned on to play the record. For example, a spindle hole is at the center of the record such that the record may be positioned on the record platter by passing the spindle of the conventional record player through the spindle hole. Once the spindle is present within the spindle hole of the record and the record is on the record platter, a stylus of at an end of a tone arm of the conventional record player is brought into contact with a surface of the record player. After the stylus is brought into contact with the surface of the record player and as the record rotates, the music present on the record is played through an audio output device (e.g., a speaker). If the record or vinyl is slightly warped and is not sufficiently flat, interruptions in playing back the music of the record or vinyl may occur resulting in unintended skips in the playback of the music. This warpage may become present as the record or vinyl becomes older through repeated use and through exposure to various environmental qualities such as humidity, temperature, etc.

BRIEF SUMMARY

The present disclosure is directed to embodiments of a record player, turntable, or phonograph that avoid or prevent the issues as discussed above with respect to the conventional record players. For example, in at least one embodiment of a record player of the present disclosure, a record platter of the at least one embodiment of the record player includes a central region and a peripheral region that surrounds the central region. The peripheral region may be laterally adjacent to an edge of the record platter. A record spindle of the at least one embodiment of the record player is at the central region of the record platter. The record spindle includes a spindle clamp having a retracted position and an extended position. A peripheral clamp of the at least one embodiment of the record player is at the peripheral region of the record platter, the peripheral clamp includes a clamped position and an unclamped position.

In operation, a record is placed onto the record platter of the at least one embodiment of the record player by passing the spindle clamp through an opening at a center of the record. Once the record is present on the record platter and the spindle clamp is present within the opening of the record, the spindle clamp is actuated from the retracted position to the extended position. When in the extended position, the spindle clamp mechanically engages with a central surface of the record at a central region of the record. Once the record is present on the record platter and the spindle clamp is present within the opening of the record, the peripheral clamp is actuated from the unclamped position to the clamped position. When in the clamped position, the peripheral clamp mechanically engages with a peripheral surface of the record at a peripheral region of the record. The peripheral region of the record may be at a peripheral edge of the record. The spindle clamp and the peripheral clamp mechanically engaging with the central surface and the peripheral surface, respectively, of the record results in the record being held flat on the record platter reducing or preventing playback issues when playing music on the record utilizing the record player.

BRIEF DESCRIPTION OF THE SEVERAL VIEWS OF THE DRAWINGS

For a better understanding of the embodiments, reference will now be made by way of example to the accompanying drawings. In the drawings, identical reference numbers identify the same or similar elements or acts unless the context indicates otherwise. The sizes and relative proportions of the elements in the drawings are not necessarily drawn to scale. For example, some of these elements may be enlarged and positioned to improve drawing legibility.

FIG. 4B is a simplified cross-sectional view of the embodiment of the record or vinyl playback device as shown in FIGS. 1A and 1B when the peripheral clamp is in the intermediate position;

DETAILED DESCRIPTION

Figure 1A:
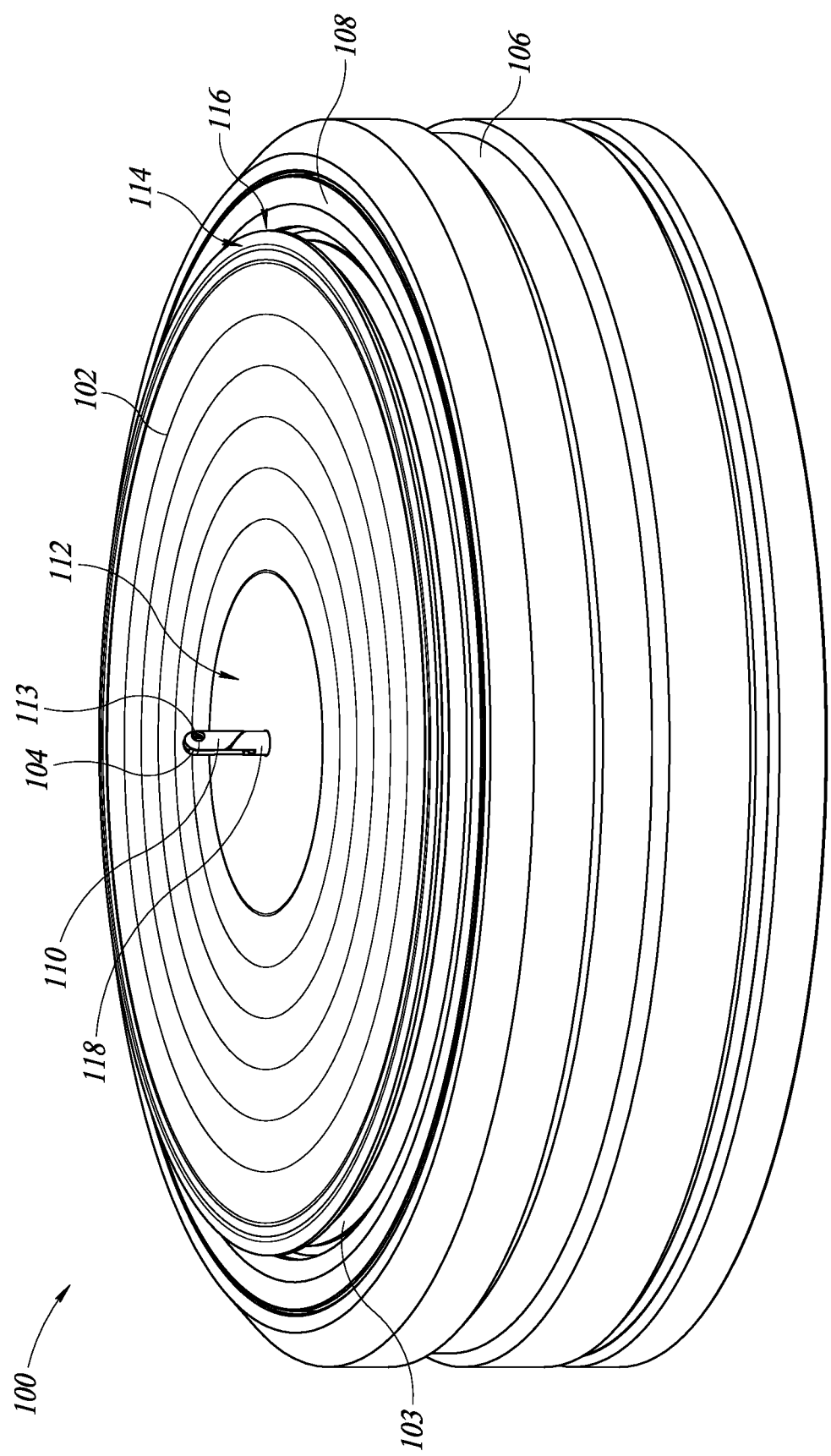
FIG. 1A is a perspective view of an embodiment of a record or vinyl playback device on which a record is present, in which a spindle clamp is in a retracted position, and in which a peripheral clamp is in an unclamped position.

In the following description, certain specific details are set forth in order to provide a thorough understanding of various embodiments of the disclosure. However, one skilled in the art will understand that the disclosure may be practiced without these specific details. In other instances, well-known structures and components associated with record or vinyl playback devices or systems or utilizing record or vinyl playback devices or systems have not been described in detail to avoid unnecessarily obscuring the descriptions of the embodiments of the present disclosure.

Unless the context requires otherwise, throughout the specification and claims that follow, the word "comprise" and variations thereof, such as "comprises" and "comprising," are to be construed in an open, inclusive sense, that is, as "including, but not limited to."

The use of ordinals such as first, second, third, fourth, etc., does not necessarily imply a ranked sense of order, but rather may only distinguish between multiple instances of an act or structure.

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terms "top," "upper," "lower," "left," and "right," are used for only discussion purposes based on the orientation of the components in the discussion of the figures in the present disclosure as follows. These terms are not limiting as to the possible positions explicitly disclosed, implicitly disclosed, or inherently disclosed in the present disclosure.

The term "substantially" is used to clarify that there may be slight differences or variations as for when a surface is coplanar with another surface in the real world, as nothing can be made perfectly equal or perfectly the same. In other words, substantially means that there may be some slight variation in actual practice, and instead, is made within accepted tolerances.

As used in this specification and the appended claims, the singular forms "a," "an," and "the" include plural referents unless the content clearly dictates otherwise.

Generally, in a conventional record player a spindle is at a center of a record platter on which a record or vinyl is positioned on to play the record utilizing the conventional record player. For example, a spindle hole is at the center of the record such that the record may be positioned on the record platter by passing the spindle of the conventional record player through the spindle hole. Once the spindle is present within the spindle hole of the record and the record is on the record platter, a stylus at an end of a tone arm of the conventional record player is brought into contact with a surface of the record player. After the stylus is brought into contact with the surface of the record player and as the record rotates, the music present on the record is played through an audio output device (e.g., a speaker). If the record or vinyl is slightly warped and is not flat enough, interruptions in playing back the music of the record of vinyl may occur resulting in unintended skips in the playback of the music. This warpage may become present as the record or vinyl becomes older through repeated use and through exposure to various environmental qualities such as humidity, temperature, etc.

For example, in an attempt to avoid playback issues due to warpage in the record, in some conventional record players, once the record is on the record platter a weight is placed on a central region of the record and a periphery clamp is clamped down on a peripheral region of the record to assist in maintaining the flatness of the record. Utilizing the weight generally requires that a user has to manually place the weight onto the record, which may result in the weight being misplaced on the record or being misaligned such that the weight does not sufficiently flatten the record when music present on the record is being played.

For example, in another attempt to avoid playback issues due to warpage in the record, in some conventional record players, once the record is on the record platter a vacuum pump or suction structure is turned on to hold the record flat on the record platter utilizing suction forces. Maintaining this vacuum or suction generally results in some noise that may be heard when playing back music from the record.

In view of the above discussion with the conventional record players, the present disclosure is directed to embodiments of a record playback device or systems that avoid or prevent the issues as discussed above with respect to the conventional record players. For example, in at least one embodiment of a record playback device of the present disclosure, a record platter of the at least one embodiment of the record player includes a central region and a peripheral region that surrounds the central region. The peripheral region may be laterally adjacent to an edge of the record platter. A record spindle of the at least one embodiment of the record playback device is at the central region of the record platter. The record spindle includes a spindle clamp having a retracted position and an extended position. A peripheral clamp of the at least one embodiment of the record playback device is at the peripheral region of the record platter, the peripheral clamp includes a clamped position and an unclamped position.

In operation, a record is placed onto the record platter of the at least one embodiment of the record playback device by passing the spindle clamp through an opening at a center of the record. Once the record is present on the record platter and the spindle clamp is present within the opening of the record, the spindle clamp is actuated from the retracted position to the extended position. When in the extended position, the spindle clamp mechanically engages with a central surface of the record at a central region of the record. Once the record is present on the record platter and the spindle clamp is present within the opening of the record, the peripheral clamp is actuated from the unclamped position to the clamped position. When in the clamped position, the peripheral clamp mechanically engages with a peripheral surface of the record at a peripheral region of the record. The peripheral region of the record may be at a peripheral edge of the record. The spindle clamp and the peripheral clamp mechanically engaging with the central surface and the peripheral surface, respectively, of the record results in the record being held flat on the record platter reducing or preventing playback issues when playing music on the record utilizing the record player. In view of the above discussion, the spindle clamp mechanically engaging with the central surface and the peripheral clamp engaging with the peripheral surface improves the overall flatness of the record during playback avoiding or preventing the issues with the conventional record players as discussed above.

FIG. 1A is a perspective view of an embodiment of a record or vinyl playback device 100 on which a record 102 is present. The record 102 is present on a record platter 103 of the playback device 100. A spindle clamp 104 of the playback device 100 is present at a center of the playback device 100 and is within an opening at a center of the record 102. For example, when the record 102 is positioned and placed on the record platter 103, the record 102 is aligned properly on the record platter 103 by inserting and passing the spindle clamp 104 through the opening at the center of the record 102. A lower surface of the record 102 may come into physical contact with a record surface of the record platter 103. A housing 106 of the record playback device 100 contains and houses respective structures to actuate the spindle clamp 104 and to actuate a peripheral clamp 108 of the record playback device.

As shown in FIG. 1A, the spindle clamp 104 is in a retracted position and the peripheral clamp 108 is in an unclamped position. When in the retracted position, one or more spindle clamp arms 110 do not mechanically engage with a central surface 112 of the record 102 at the central region of the record 102. These spindle clamp arms 110 may be referred to as spindle clamp retention structures, spindle clamp wings, or some other suitable reference to the spindle clamp arms 110. The one or more spindle clamp arms 110 are rotatable and pivotable about a pivot 113 of the spindle clamp 104. When in the unclamped position, the peripheral clamp 108 does not mechanically engage with a peripheral surface 114 of the record 102 at the peripheral region of the record 102. The peripheral region of the record 102 surrounds the central region of the record 102. The peripheral surface 114 is laterally adjacent to an edge 116 of the record 102.

The spindle clamp 104 includes a shaft 118 about which the one or more spindle clamp arms 110 are rotatable and pivotable about the pivot 113. In other words, the one or more spindle clamp arms 110 are coupled to the shaft 118 of the spindle clamp 104 by the pivot 113 (e.g., a pivot pin, pivot fastener, etc.). The shaft 118 of the spindle clamp 104 is in a raised position as shown in FIG. 1A.

The peripheral clamp 108 includes a plurality of clamp structures 120 (see FIGS. 2A-2D) that is in a lowered position as shown in FIG. 1A. For example, the clamp structures 120 may be within the housing 106 when in the lowered position as shown in FIG. 1A.

Figure 1B:
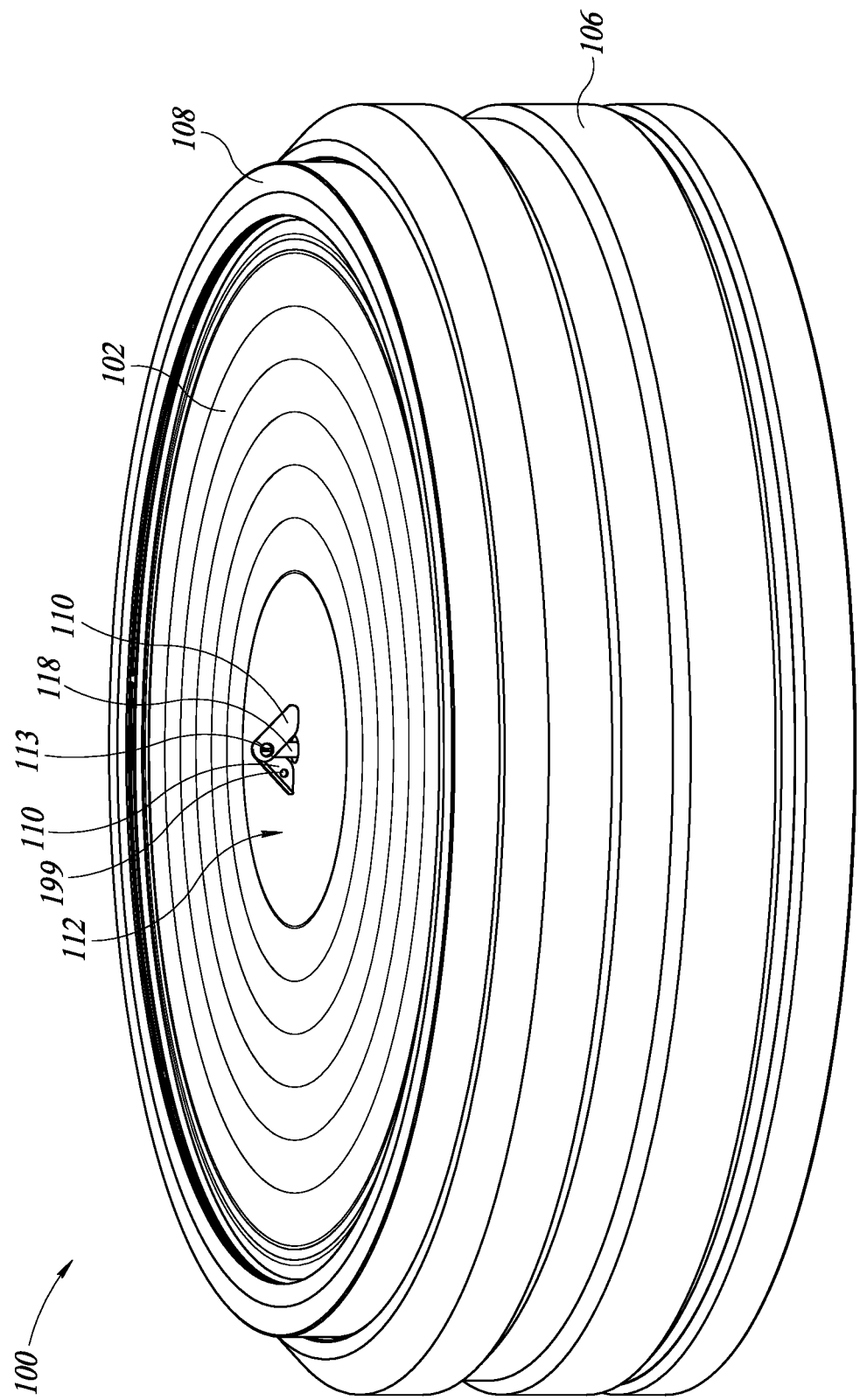
FIG. 1B is a perspective view of the embodiment of the record or vinyl playback device on which the record is present, in which the spindle clamp is in an extended position, and in which the peripheral clamp is in a clamped position.

FIG. 1B is a perspective view of the embodiment of the record or vinyl playback device 100 on which the record 102 is present. Unlike FIG. 1A, as shown in FIG. 1B, the spindle clamp 104 is in an extended position and the peripheral clamp 108 is in a clamped position.

When the spindle clamp 104 is in the extended position, the shaft 118 of the spindle clamp 104 is in a lowered position and the one or more spindle clamp arms 110 are rotated outward such that respective ends of the spindle clamp arms 110 mechanically engage with the central surface 112 of the record 102. In other words, the one or more spindle clamp arms 110 are rotated outward when the shaft 118 is in the lowered position.

When the peripheral clamp 108 is in the clamped position, the clamp structures 120 are in a raised position and mechanically engage with the peripheral surface 114 or the edge 116 of the record 102. In other words, respective lower surfaces of the clamp structures 120 mechanically engage with the peripheral surface 114 of the record 102.

When the spindle clamp arms 110 of the spindle clamp 104 and the clamp structures 120 of the peripheral clamp 108 are in mechanical engagement with the record 102, the record 102 is held flat to reduce or prevent playback issues (e.g., playback skipping or interrupts) improving playback quality of music on the record 102. For example, these playback issues may be playback skips or interrupts in which a piece or portion of music is skipped or un-played when the record is rotating and is in contact with a stylus at an end of a tone arm 155 (see FIGS. 4A-4C and 5A-5C of the present disclosure) of the record playback device 100. These playback skips or interrupts may be referred to as "jumping." Respective mechanical engagement with or pressure applied by the respective ends of the spindle clamp arms 110 of the spindle clamp 104 and the clamp structures 120 of the peripheral clamp 108 with the record 102 may be selected to provide enough mechanical engagement or apply enough pressure to maintain a flatness of the record 102 while preventing or avoiding damaging the record 102 when present on the record platter 103.

Figure 2A:
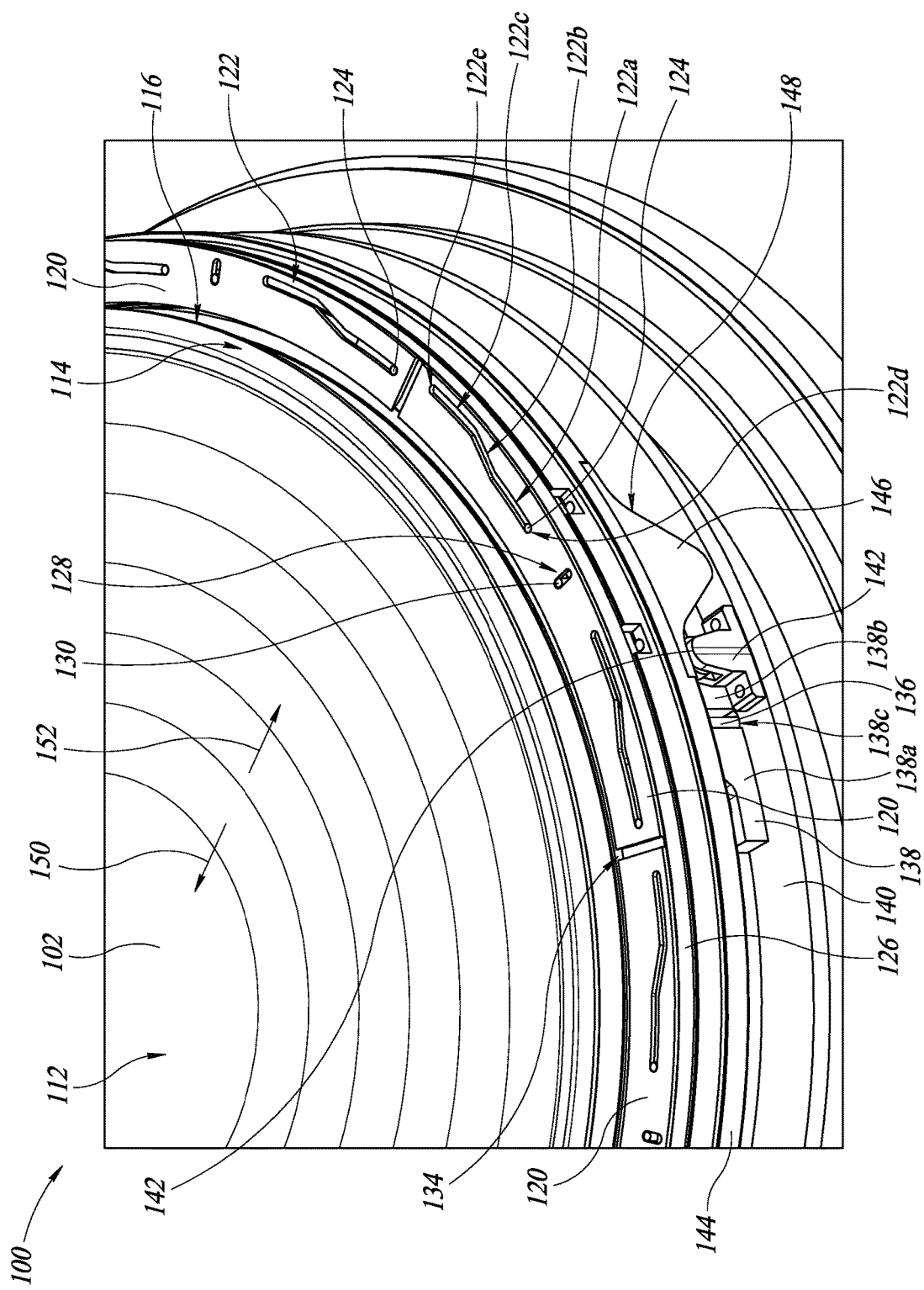
FIG. 2A is a perspective view of the embodiment of the record or vinyl playback device as shown in FIGS. 1A and 1B with some respective components hidden such that internal components are visible, and in which the peripheral clamp is in the unclamped position.
Figure 2B:
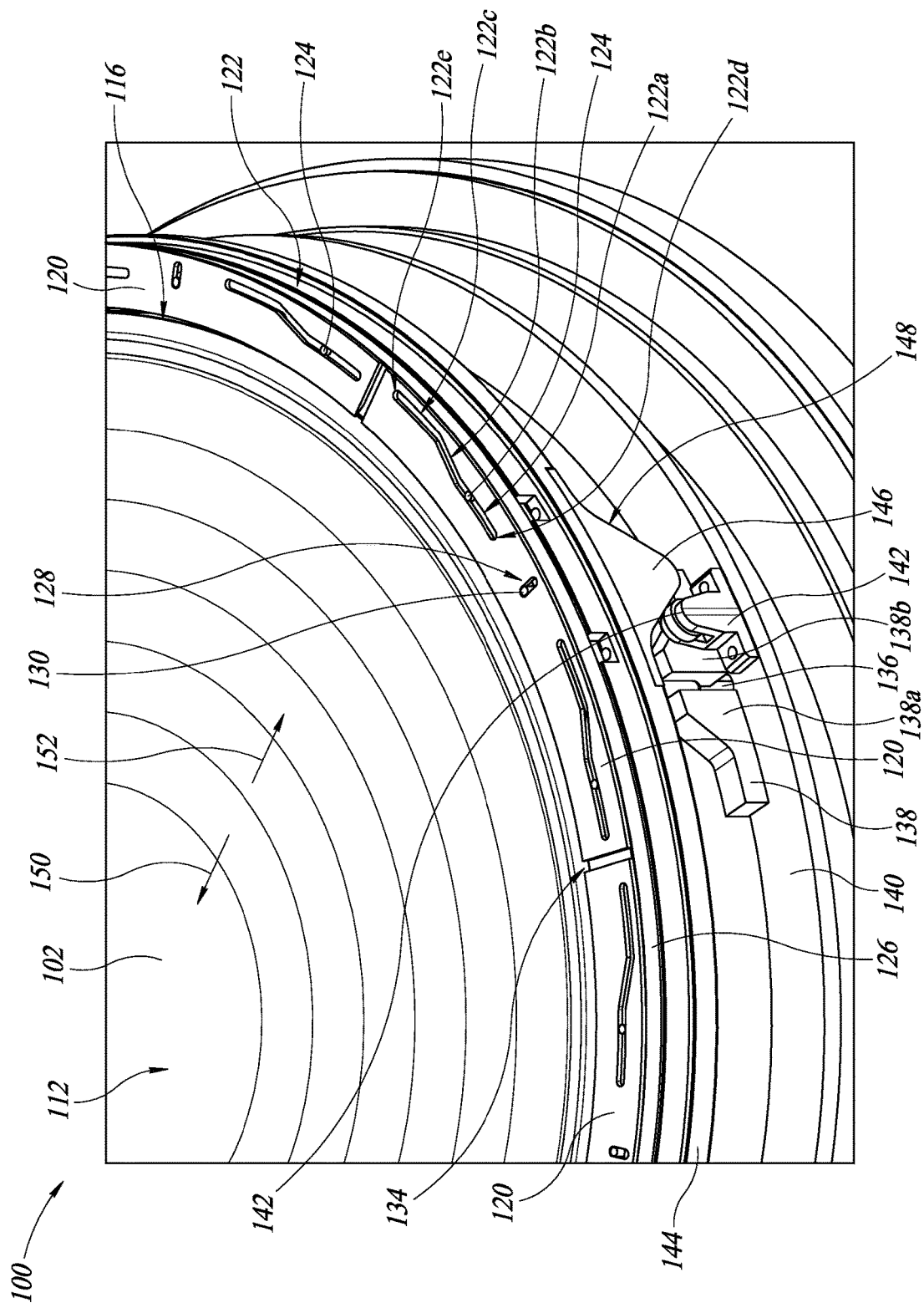
FIG. 2B is a perspective view of the embodiment of the record or vinyl playback device as shown in FIGS. 1A and 1B with some respective components hidden such that internal components are visible, and in which the peripheral clamp is in an intermediate position between the unclamped position and the clamped position.
Figure 2C:
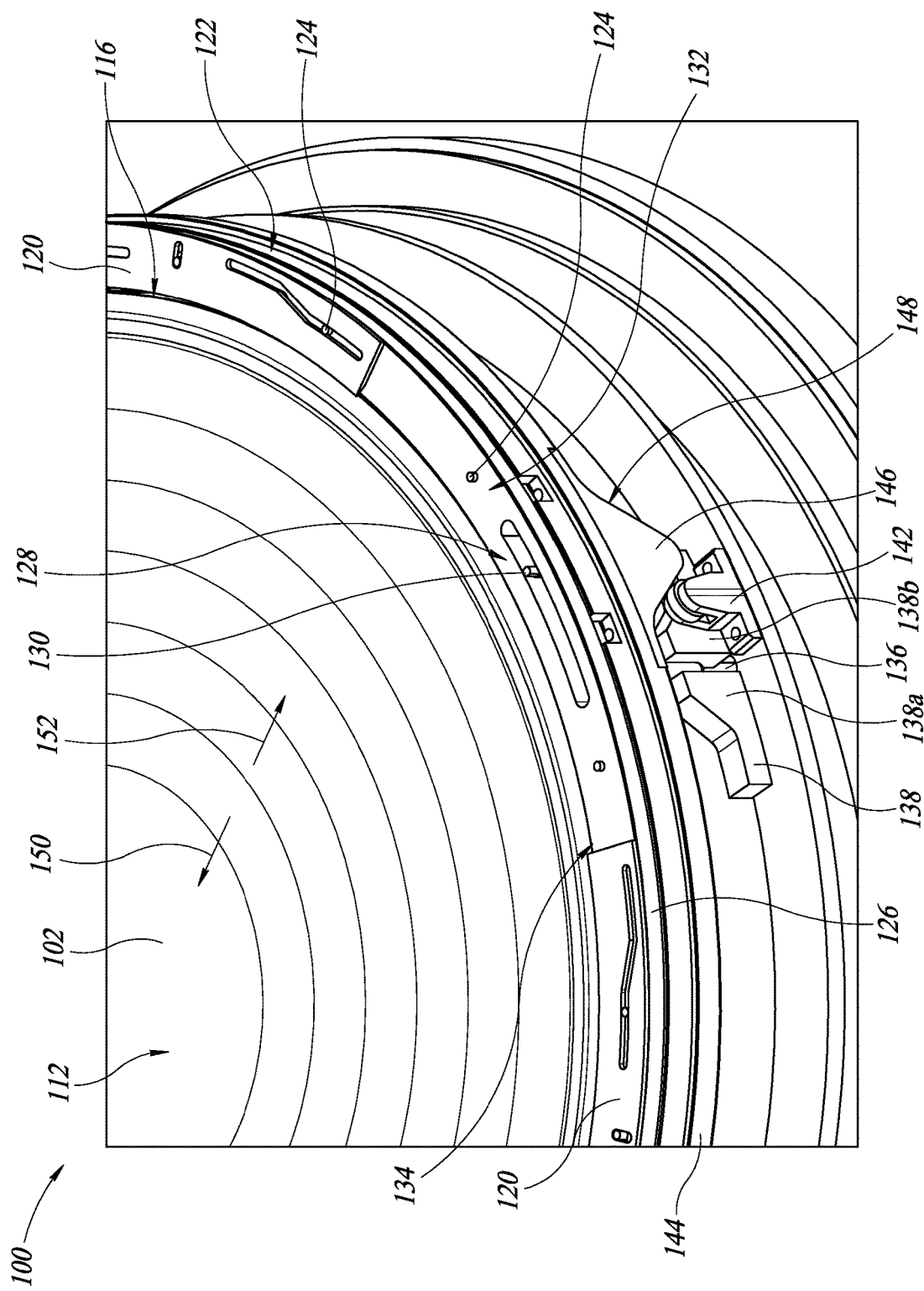
FIG. 2C is a perspective view of the embodiment of the record or vinyl playback device as shown in FIGS. 1A and 1B with some respective components hidden such that internal components are visible, and in which the peripheral clamp is in the intermediate position between the unclamped position and the clamped position.
Figure 2D:
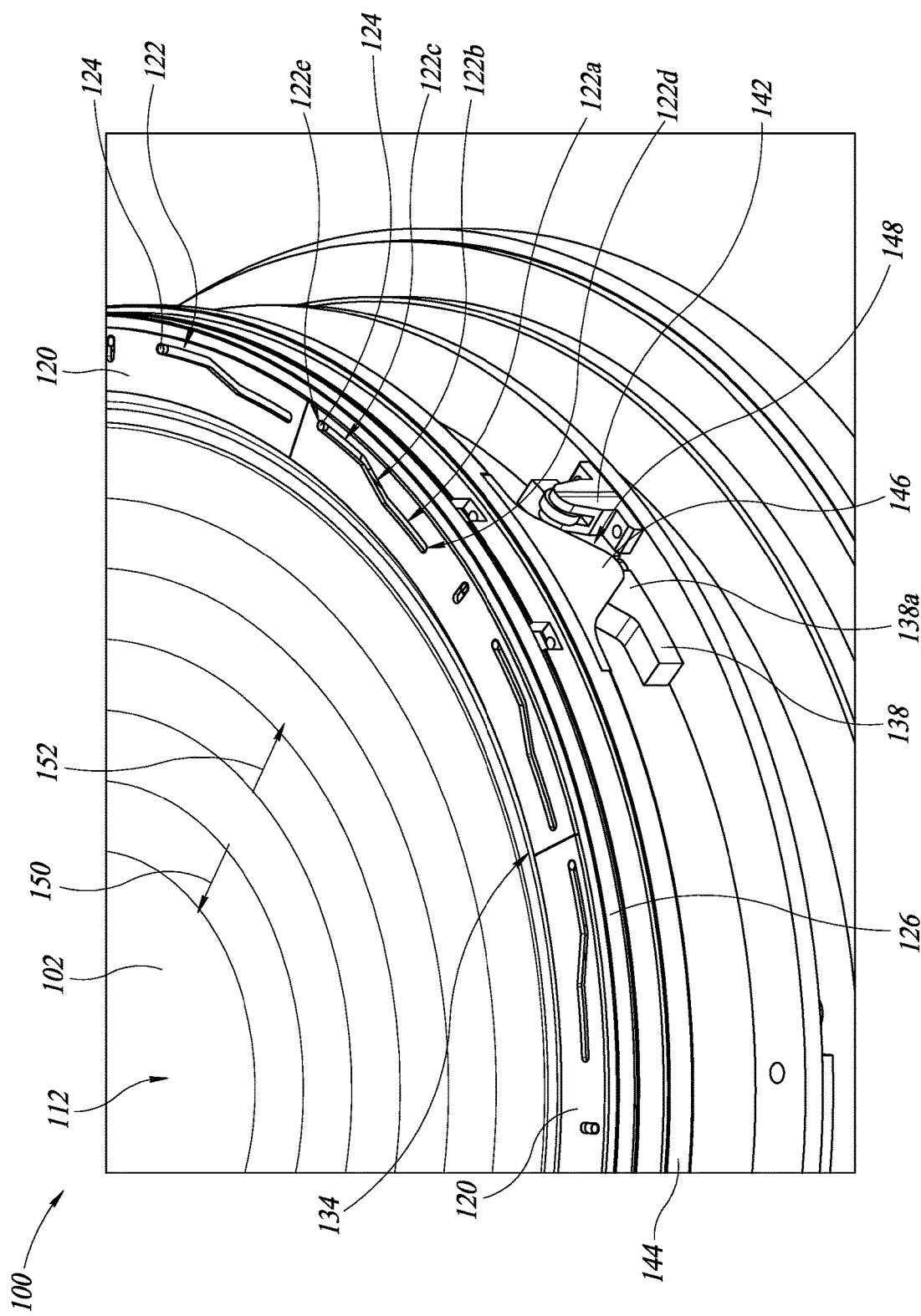
FIG. 2D is a perspective view of the embodiment of the record or vinyl playback device as shown in FIGS. 1A and 1B with some respective components hidden such that internal components are visible, and in which the peripheral clamp is in the clamped position.

FIG. 2A is a perspective view of the embodiment of the record or vinyl playback device 100 as shown in FIGS. 1A and 1B with some respective components hidden such that internal components are visible, and in which the peripheral clamp 108 is in the unclamped position. FIG. 2B is a perspective view of the embodiment of the record or vinyl playback device 100 as shown in FIGS. 1A and 1B with some respective components hidden such that internal components are visible, and in which the peripheral clamp 108 is in an intermediate position between the unclamped position and the clamped position. FIG. 2C is a perspective view of the embodiment of the record or vinyl playback device 100 as shown in FIGS. 1A and 1B with some respective components hidden (e.g., one of the clamp structures 120) such that some components, structures, and features are more readily visible, and in which the peripheral clamp 108 is in the intermediate position between the unclamped position and the clamped position. FIG. 2D is a perspective view of the embodiment of the record or vinyl playback device 100 as shown in FIGS. 1A and 1B with some respective components hidden such that internal components are visible, and in which the peripheral clamp 108 is in the clamped position. In other words, FIGS. 2A-2D depict operation of the peripheral clamp 108 of the record or vinyl playback device 100 being moved from the unclamped position to the clamp position in which the peripheral clamp 108 mechanically engages with the record 102.

In FIG. 2A, the clamp structures 120 of the peripheral clamp 108 are in the positions as shown in FIG. 1A in which the clamp structures 120 are in the lowered position and may be within the housing 106. In FIG. 2A, the peripheral clamp 108 is in the unclamped position. The clamp structures 120 each include one or more first guide pathways 122. Each one of the first guide pathways 122 includes a first portion 122a, a second portion 122b, and a third portion 122c. The second portion 122b extends from the first portion 122a to the third portion 122c such that the first and third portions 122a, 122c are interconnected by the second portion 122b. The second portion 122b is transverse to the first and third portions 122a, 122c, respectively. Each one of the first guide pathways 122 includes a first end 122d and a second end 122e that is opposite the first end 122d. In FIG. 2D, the clamp structures 120 of the peripheral clamp 108 are in a raised position relative to the lowered position as shown in FIG. 2A and are in mechanical engagement with the peripheral surface 114 of the record 102, the edge 116 of the record 102, or both. In FIG. 2D, the peripheral clamp 108 is in the clamped position. In FIGS. 2B and 2C, the clamp structures 120 of the peripheral clamp 108 are in an intermediate position between the clamped and unclamped positions of the peripheral clamp 108 as shown in FIGS. 2A and 2D, respectively.

One or more first guide pins 124 are present within the first guide pathways 122. Each one of the first guide pins 124 is in a corresponding one of the first guide pathways 122. The first guide pins 124 are in mechanical cooperation with an upper rotation structure 126 of the peripheral clamp 108. The upper rotation structure 126 rotates in a counterclockwise and clockwise direction such that the first guide pins 124 readily pass through and along the first guide pathways 122. For example, in operation, as the first guide pins 124 move along the first guide pathways 122 in the counterclockwise direction, the first guide pins 124 move along the first, second, and third portions 122a, 122b, 122c, respectively, of the first guide pathways 122 moving the clamp structures 120 inwards towards the spindle clamp 104 and to the clamped position of the peripheral clamp 108. Oppositely, in operation, as the first guide pins 124 move along the first guide pathways 122 in the clockwise direction, the first guide pins 124 move along the first, second, and third portions 122a, 122b, 122c, respectively, of the first guide pathways 122 moving the clamp structures 120 outwards and away from the spindle clamp 104 to the unclamped position of the peripheral clamp 108.

One or more second guide pathways 128 extend through the clamp structures 120. The second guide pathways 128 are transverse to the first guide pathways 122. One or more second guide pins 130 are present in each one of the second guide pathways 128. In other words, each one of the second guide pins 130 is in a corresponding one of the second guide pathways 128. The second guide pathways 128 and the second guide pins 130 may be structured and configured to limit or direct the inward and outward movement as well as limit lateral or side-to-side movement of the clamp structures 120 while the first guide pins 124 move along the first guide pathways 122, respectively, as the upper rotation structure 126 rotates. For example, in operation, as the first guide pins 124 move along the first guide pathways 122 due to rotating the upper rotation structure 126, the second guide pins 130 remain stationary relative to the rotation of the upper rotation structure 126 and the second guide pathways 128 slide along the second guide pins 130 such that the clamp structures 120 move inwards and outwards and do not move side-to-side.

Each one of the second guide pins 130 is present within a corresponding one of a plurality of second guide pin slots 132 (see FIG. 2C of the present disclosure in which one of the clamp structures 120 is hidden for visibility of one of the second guide pin slots 132) in the upper rotation structure 126. The second guide pin slots 132 are wide enough such that as the upper rotation structure 126 rotates the second guide pins 130 remain stationary relative to the upper rotation structure 126 and such that as the upper rotation structure 126 rotates the upper rotation structure 126 does not mechanically engage with the second guide pins 130.

A plurality of clamp structure slots 134 are present between adjacent ones of the clamp structures 120. Each one of the clamp structure slots 134 separates adjacent ones of the clamp structures 120 when the peripheral clamp 108 is in the unclamped position as shown in FIG. 2A. The plurality of clamp structure slots 134 are present to provide enough degree of freedom for the clamp structures 120 to move inward when moving the peripheral clamp 108 from the unclamped position as shown in FIG. 2A to the clamped position as shown in FIG. 2D.

A rod 136 of the upper rotation structure 126 protrudes from a side of the rotation structure 126 opposite to a side from which the first and second guide pins 124, 130 protrude from the rotation structure 126. The rod 136 is present within a translating structure 138 of a lower rotation structure 140. The translating structure 138 includes a first portion 138a and a second portion 138b that delimit a rod slot 138c that is between the first and second portions 138a, 138b, respectively, and receives the rod 136. In operation, the rod 136 may move upwards and downwards along the rod slot 138c. In operation, the translating structure 138 rotates along with the lower rotation structure 140, and the rod 136 mechanically engages with the translating structure 138 to transfer a rotation of the lower rotation structure 140 to the upper rotation structure 126 to rotate the upper rotation structure 126 moving the clamp structures 120 inwards and outwards.

A wheel structure 142 of the lower rotation structure 140 mechanically engages with a lift structure 144 of the peripheral clamp 108. More specifically, a curved protrusion 146 of the lift structure 144 mechanically engages with the wheel structure 142. For example, as the lower rotation structure 140 rotates in the clockwise and counterclockwise directions, the wheel structure 142 rotates along with the lower rotation structure 140 and mechanically engages with a curved surface 148 of the curved protrusion 146. As the wheel structure 142 slides along the curved surface 148 of the curved protrusion 146 in the counterclockwise direction, the curved protrusion 146 is moved upwards raising and lifting the lift structure 144 and the upper rotation structure 126, and is then moved downwards to mechanically engage the clamp structures 120 with the peripheral surface 114 or edge 116 of the record 102. Oppositely, as the wheel structure 142 slides along the curved surface 148 of the curved protrusion 146 in the clockwise direction, the curved protrusion 146 is moved upwards raising and lifting the lift structure 144 and the upper rotation structure 126, and is then moved downwards to mechanically disengage the clamp structures 120 with the peripheral surface 114 or edge 116 of the record 102. In other words, when moving in the counterclockwise direction, the wheel structure 142 mechanically engages with the curved surface 148 of the curved protrusion 146 to assist in moving the clamp structures 120 to mechanically engage with the record (e.g., move from the unclamped position to the clamped position of the peripheral clamp 108), and, oppositely, when moving in the clockwise direction, the wheel structure mechanically engages with the curved surface 148 of the curved protrusion 146 to assist in moving the clamp structures 120 to mechanically disengage with the record 102 (e.g., move from the clamped position to the unclamped position of the peripheral clamp 108).

In some embodiments, the rod 136 is one of a plurality of rods of the upper rotation structure 126, the translating structure 138 is one of a plurality of translating structures of the lower rotation structure 140, the wheel structures 142 is one of a plurality of wheel structures of the lower rotation structure 140, and the curved protrusion 146 is one of a plurality of protrusions of the lift structure 144. Each one of the plurality of rods is in a corresponding one of the plurality of translating structures, and each one of the plurality of protrusions mechanically engages with a corresponding one of the plurality of wheels.

Figure 4A:
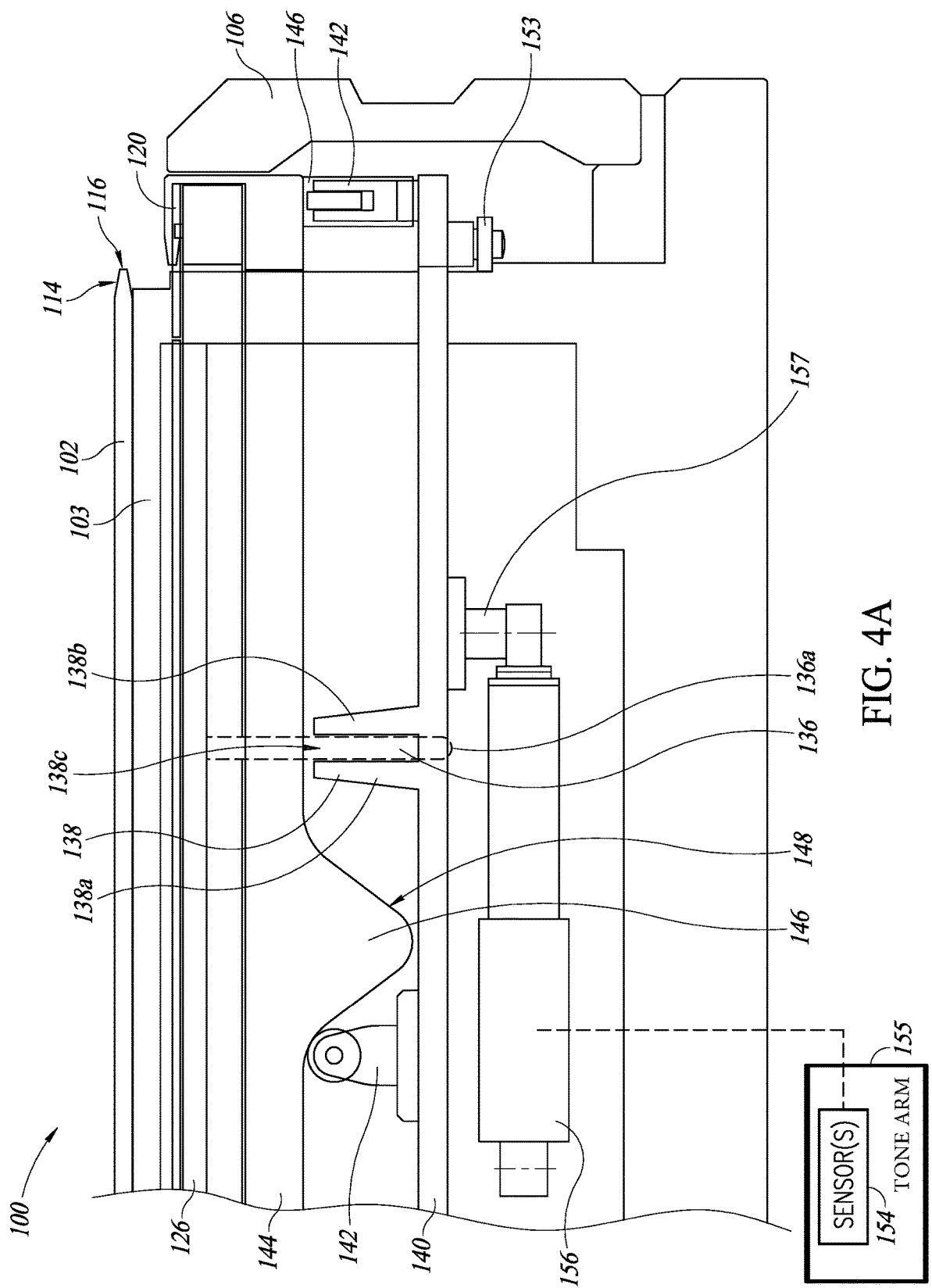
FIG. 4A is a simplified cross-sectional view of the embodiment of the record or vinyl playback device as shown in FIGS. 1A and 1B when the peripheral clamp is in the unclamped position.
Figure 4C:
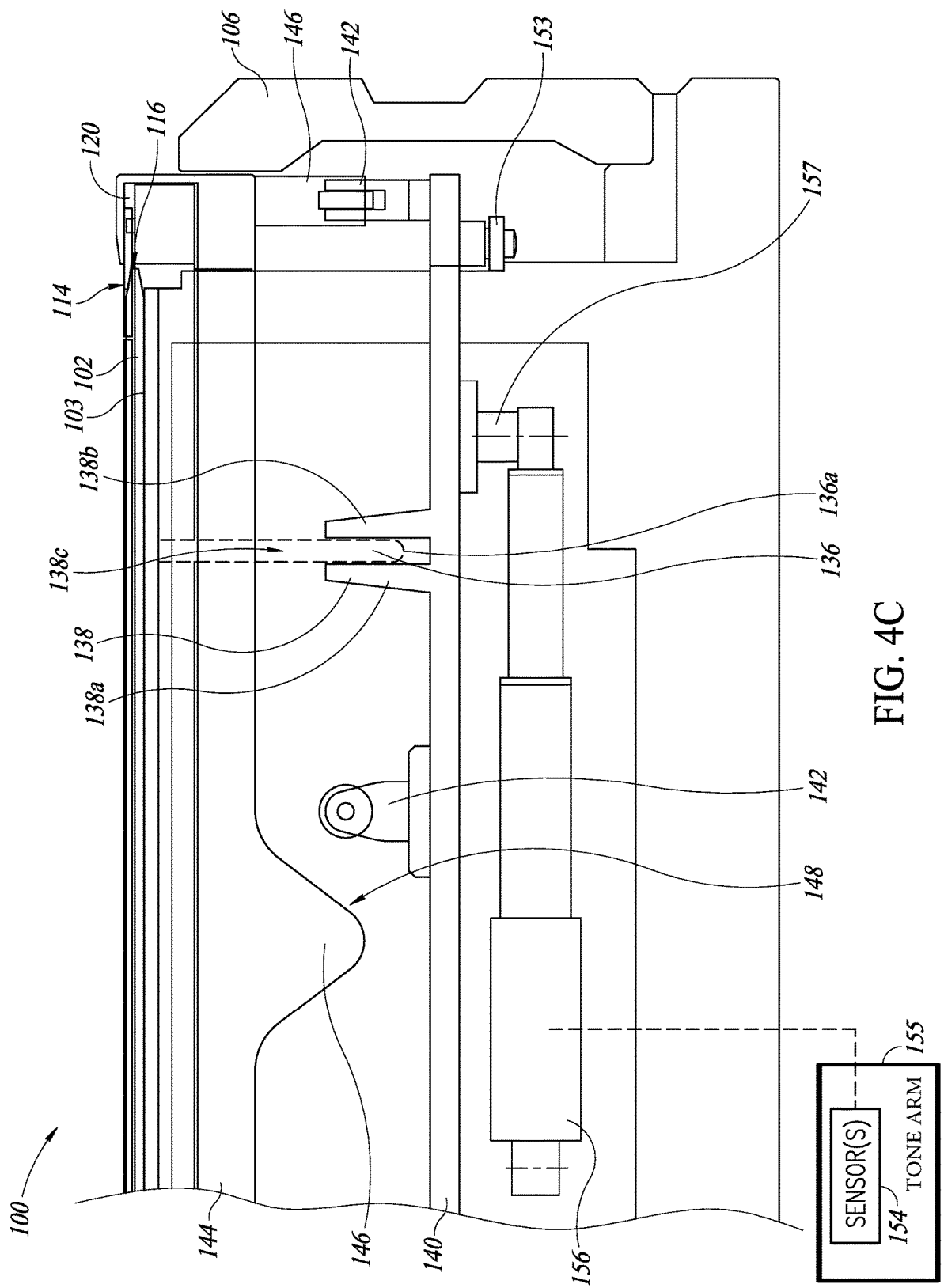
FIG. 4C is a simplified cross-sectional view of the embodiment of the record or vinyl playback device as shown in FIGS. 1A and 1B when the peripheral clamp is in the clamped position.

In view of the above discussion, in a method of operation of the peripheral clamp 108 as shown in FIGS. 2A-2D of the present disclosure, the record 102 is initially placed on the record platter 103 such that the spindle clamp 104 is present within an opening at the center of the record 102. Once the record 102 is on the record platter 103 and the spindle clamp 104 is present within the opening at the center of the record 102, the peripheral clamp 108 is actuated from the unclamped position as shown in FIG. 2A to the clamped position as shown in FIG. 2D. For example, actuating of the peripheral clamp 108 from the unclamped position to the clamped position may be initiated or triggered when one or more sensors 154 (see FIGS. 4A-4C and 5A-5C of the present disclosure) determines or detects that the tone arm 155 (see FIGS. 4A-4C and 5A-5C of the present disclosure) of the playback device 100 is being moved to bring the stylus in contact with the record 102 to playback music stored on the record 102 or when the one or more sensors 154 detect the stylus at the end of the tonearm 154 is over the record platter 103. In some embodiments, the one or more sensors 154 are within the tone arm 155 (see FIGS. 4A-4C and 5A-5C). Once the actuation of the peripheral clamp 108 is initiated, the lower rotation structure 140 beings to rotate in the counterclockwise direction, for example, by being actuated by a lower rotation structure actuation device 156 (e.g., an electrical motor) as shown in FIGS. 4A-4C. As the lower rotation structure 140 rotates in the counterclockwise direction, the wheel structure 142 rotates along with the lower rotation structure 140 and the translating structure 138 rotates along with the lower rotation structure 140.

As the translating structure 138 rotates along with the lower rotation structure 140 and the rod 136 of the upper rotation structure 126 is present within the rod slot 138c, the rod 136 rotates along with the rotation of the translating structure 138 such that the rotation of the lower rotation structure 140 is transferred and mimicked by the upper rotation structure 126. As the upper rotation structure rotates 126, the first guide pins 124 rotate along with the upper rotation structure 126 such that the first guide pins move through the first, second, and third portions 122a, 122b, 122c, respectively, of the first guide pathways 122, and the first guide pins move through the first guide pathways 122 from the first end 122d towards the second end 122e. The first guide pins 124 start at the first ends 122d of the first guide pathways 122 as shown in FIG. 2A, and, as the upper rotation structure 126 is rotated due to the rotation of the lower rotation structure 140, the first guide pins 124 eventually reach the intermediate position as shown in FIGS. 2B and 2C. Once the upper rotation structure 126 is fully rotated by the rotation of the lower rotation structure 140, the first guide pins 124 are present at the second ends 122e of the first guide pathways 122.

The first guide pins 124 traveling along the first guide pathways 122 as discussed causes the clamp structures 120 to move inward towards the center of the record 102. As shown in FIG. 2A, in the unclamped position of the peripheral clamp 108, the clamp structure slots 134 are present between each adjacent pair of the clamp structures 120. As the upper rotation structure 126 is rotated such that the first guide pins 124 travel along the first guide pathways 122, the clamp structure slots 134 are reduced in size at the intermediate position of the peripheral clamp 108 as the clamp structures 120 move inward towards the center of the record 102. Once the upper rotation structure 126 is fully rotated by the rotation of the lower rotation structure 140, the clamp structure slots 134 are fully closed such that the clamp structure slots 134 may not be present between each adjacent pair of the clamp structures 120. Once the upper rotation structure 126 is fully rotated by the rotation of the lower rotation structure 140, respective ends of adjacent ones of the clamp structures 120 may be abutting each other such that the clamp structure slots 134 are no longer present when the peripheral clamp 108 is in the clamped position. This complete closing off of the clamp structure slots 134 may be readily seen in FIG. 2D once the upper rotation structure 126 has been fully rotated. Once the upper rotation structure 126 is fully rotated, the clamp structures 120 are positioned inward when the peripheral clamp 108 is in the clamped position as shown in FIG. 2D relative to a position of the clamp structures 120 when the peripheral clamp 108 is in the unclamped position as shown in FIG. 2A. In other words, rotation of the upper rotation structure 126 results in the clamp structures 120 moving in an inward direction represented by an arrow 150 as shown in FIGS. 2A-2D.

As the first guide pins 124 travel along the first guide pathways 122, the second guide pathways 128 slide along the second guide pins 130 in the inward direction represented by the arrow 150 as shown in FIGS. 2A-2D. The second guide pins 130 are structured and configured to act as guides that direct motion of the clamp structures 120 due to rotation of the upper rotation structure 140 to be directed along the inward direction represented by the arrow 150 when moving the peripheral clamp 108 from the unclamped position to the clamped position. Similarly, the second guide pins 130 are structured and configured to act as guides that direct motion of the clamp structures 120 due to rotation of the upper rotation structure 140 to be directed along an outward direction represented by an arrow 152 when moving the peripheral clamp 108 from the clamped position to the unclamped position.

As wheel structure 142 rotates along with the lower rotation structure 140, the wheel structure 142 eventually comes into mechanical engagement with the curved surface 148 of the curved protrusion 146 of the lift structure 144. The wheel structure 142 then slides along and pushes on the curved surface 148 such that the lift structure 144 is raised as the wheel structure 142 moves along the curved surface 148 of the curved protrusion 146 of the lift structure 144. As shown in FIG. 2A, when the peripheral clamp 108 is in the unclamped position, the peripheral clamp 108 is in a lowered state or position such that the peripheral clamp 108 is present within the housing 106. In other words, as the lower rotation structure 140 is rotated in the counterclockwise direction, the wheel structure 142 pushes on the curved surface 148 resulting in the lift structure 144 being moved upward and lifting up the upper rotation structure 126 and the clamp structures 120. At an apex of the curved protrusion 146, which has a parabolic shape as shown in FIGS. 2A-2D, respective lower surfaces of the clamp structures 120 are higher than the peripheral surface 114 and edge 116 of the record 102. As the wheel structure 142 mechanically engages with the curved surface 148 of the curved protrusion 146, the clamp structures 120 are concurrently moving in the inward direction represented by the arrow 150. Once the wheel structure 142 is past the apex of the curved protrusion 146, the lift structure 144 is lowered as the wheel structure 142 continues to move along the curved surface 148. As the lift structure 144 is lowered as the wheel structure 142 continues to move in the counterclockwise direction, the respective lower surfaces of the clamp structures 120 catch on and mechanically engage with the peripheral surface 114 of the record 102, the edge 116 of the record 102, or both such that the clamp structures 120 clamp onto the record 102 at a peripheral region of the record 102.

In view of the above discussion with respect to FIGS. 2A-2D of moving the peripheral clamp 108 from the unclamped position to the clamped position, this process may be reversed to move the peripheral clamp 108 from the clamped position to the unclamped position by rotating the lower rotation structure 140 in the clockwise direction when the peripheral clamp 108 is present in the clamped position as shown in FIG. 2D. When the reverse process is carried out to move the peripheral clamp 108 from the clamped position to the unclamped position, the clamp structures 120 move in the outward direction represented by the arrow 152 as shown in FIGS. 2A-2D, and the process starts at FIG. 2D and ends up at FIG. 2A by passing through the intermediate position as shown in FIGS. 2B and 2C. However, for the sake of simplicity and brevity of the present disclosure, further discussion of reversing the above process to move the peripheral clamp 108 from the clamped position to the unclamped position will not be discussed in detail herein as it will be readily appreciated how the components of the peripheral clamp 108 will work together to move the peripheral clamp 108 from the clamped position to the unclamped position.

In view of the above discussion with respect to FIGS. 2A-2D of moving the peripheral clamp 108 from the unclamped position to the clamped position, the spindle clamp 104 will be actuated concurrently to the extended position or in quick succession before or after actuating of the peripheral clamp 108 to the extended position such that the spindle clamp 104 mechanically engages with the central surface 112 of the record 102. For example, before playback of the record 102 begins utilizing the playback device 100, both the spindle clamp arms 110 and the clamp structures 120 are brought into mechanical engagement with the central and peripheral regions, respectively, of the record 102. The discussion of actuation of the spindle clamp 104 between the retracted and extended positions will be discussed in further detail with respect to FIGS. 5A-5C of the present disclosure.

The operation of the spindle clamp 104 and the peripheral clamp 108 may be initiated based on the one or more sensors 154 (see FIGS. 4A-4C and 5A-5C of the present disclosure) present within the tone arm 155 (see FIGS. 4A-4C and 5A-5C of the present disclosure) of the playback device 100. For example, as the tone arm 155 of the playback device 100 is brought into proximity of the record 102 or record platter 103 to bring the stylus in contact with the record 102, the one or more sensors 154 may send a signal to the spindle clamp 104 and the peripheral clamp 108 to initiate actuation of the spindle clamp 104 and the peripheral clamp 108 such that the spindle clamp arms 110 and the clamp structures 120 become mechanically engaged with the record 102. Oppositely, as the tone arm 155 of the playback device 100 is brought out of proximity of the record when stopping playback of the record 102, the one or more sensors 154 may send a signal to the spindle clamp 104 and the peripheral clamp 108 to initiate actuation of the spindle clamp 104 and the peripheral clamp 108 such that the spindle clamp arms 110 and the clamp structures 120 mechanically disengage with the record 102. In other words, actuation of the spindle clamp 104 and the peripheral clamp 108 to mechanically engage and disengage the spindle clamp 104 and the peripheral clamp 108 with the record 1021 is initiated by the one or more sensors 154 detecting when the tone arm 155 is rotated towards the record 102 or record platter 103, the stylus of the tone arm 155 is over the record 102 or the record platter 103, the tone arm 155 is rotated away from the record 102 or record platter 103, the stylus of the tone arm 155 is not over the record 102 or the record platter 103, or a combination of these various factors that may be detected by the one or more sensors 154, The one or more sensors 154 may be in electrical communication with the lower rotation structure actuation device 156 that controls actuation of the rotation of the lower rotation structure 140, and in electrical communication with a piston device 158 (see FIGS. 5A-5C of the present disclosure) that controls actuation of the spindle clamp 104. Controlling the spindle clamp 104 will be discussed in further detail later herein with respect to FIGS. 5A-5C of the present disclosure.

Figure 3A:
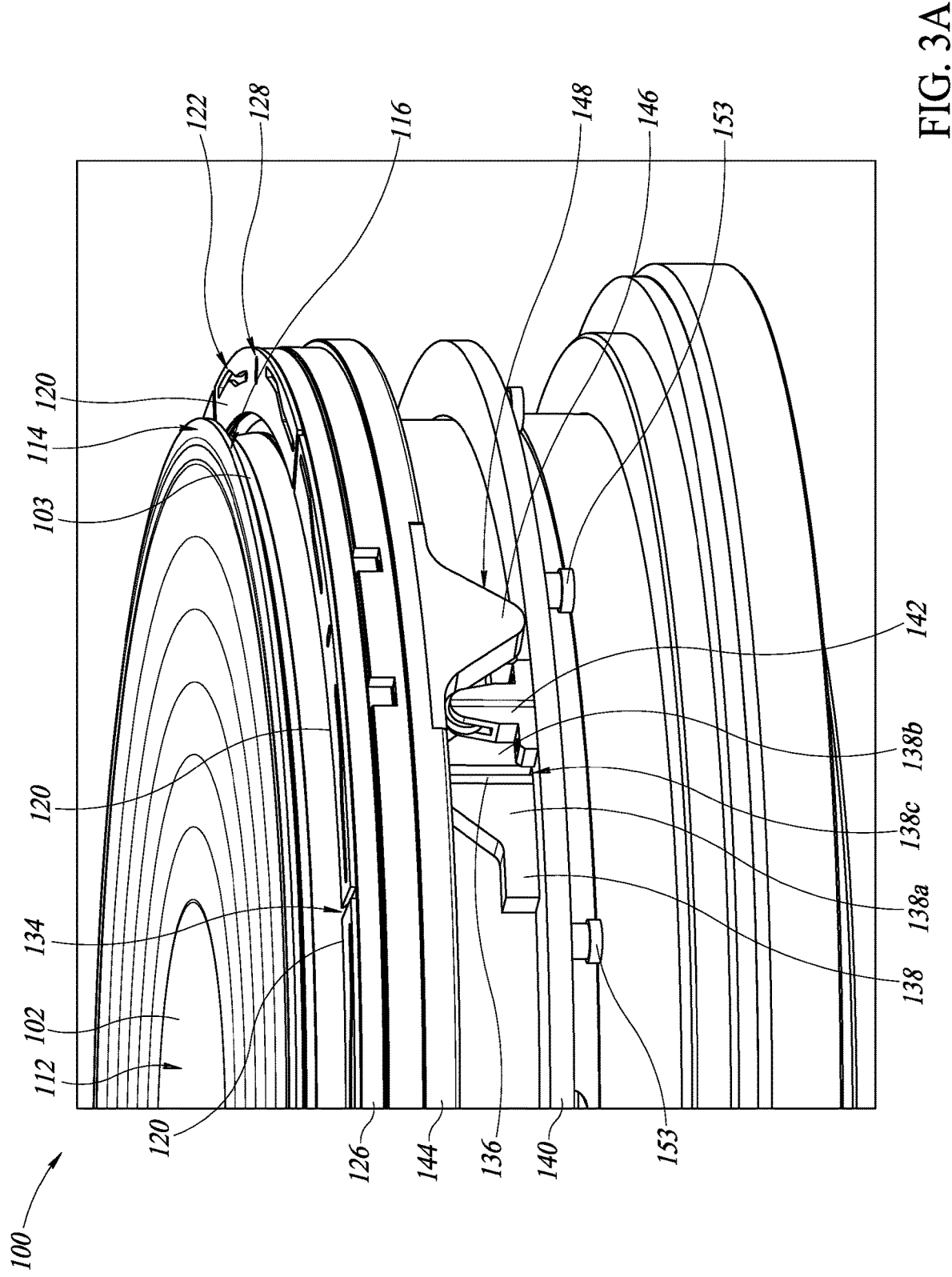
FIG. 3A is a perspective view of the embodiment of the record or vinyl playback device as shown in FIGS. 1A and 1B with some respective components hidden such that internal components are visible, and in which the peripheral clamp is in the unclamped position.

FIG. 3A is a perspective view of the embodiment of the record or vinyl playback device 100 as shown in FIGS. 1A and 1B with some respective components hidden such that internal components are visible, and in which the peripheral clamp 108 is in the unclamped position. FIG. 3A corresponds to FIG. 2A in that FIG. 3A shows the peripheral clamp 108 in the unclamped position as shown in FIG. 2A in which the peripheral clamp 108 is within the housing 106.

As shown in FIG. 3A, a plurality of transverse wheels 153 are present on a side of the lower rotation structure 140 opposite to a side of the lower rotation structure 140 from which the wheel structure 142 and the translating structure 138 protrudes. The plurality of transverse wheels 153 provide a degree of freedom of the lower rotation structure 140 such that the lower rotation structure 140 may rotate in the clockwise and the counterclockwise directions, respectively.

Figure 3B:
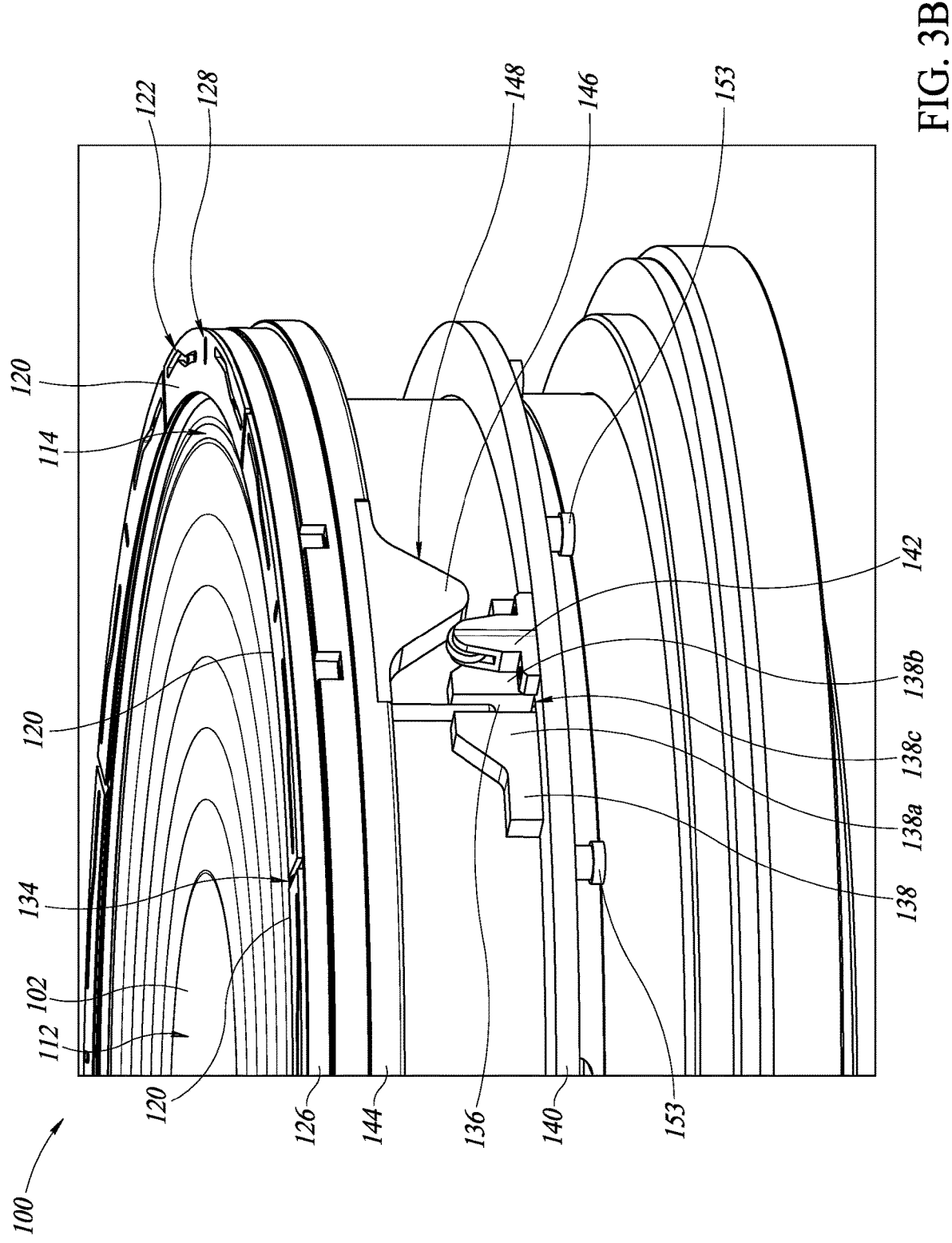
FIG. 3B is a perspective view of the embodiment of the record or vinyl playback device as shown in FIGS. 1A and 1B with some respective components hidden such that internal components are visible, and in which the peripheral clamp is in the intermediate position.

FIG. 3B is a perspective view of the embodiment of the record or vinyl playback device 100 as shown in FIGS. 1A and 1B with some respective components hidden such that internal components are visible, and in which the peripheral clamp 108 is in the intermediate position. FIG. 3B corresponds to FIGS. 2B and 2C in that FIG. 3B shows the peripheral clamp 108 in the intermediate position as shown in FIGS. 2B and 2C between the unclamped position and the clamped position. As shown in FIG. 3B, the wheel structure 142 is in mechanical engagement with the curved surface 148 of the curved protrusion 146 such that the clamp structures 120 are raised higher than an upper surface of the record 102 when present on the record platter 103.

Figure 3C:
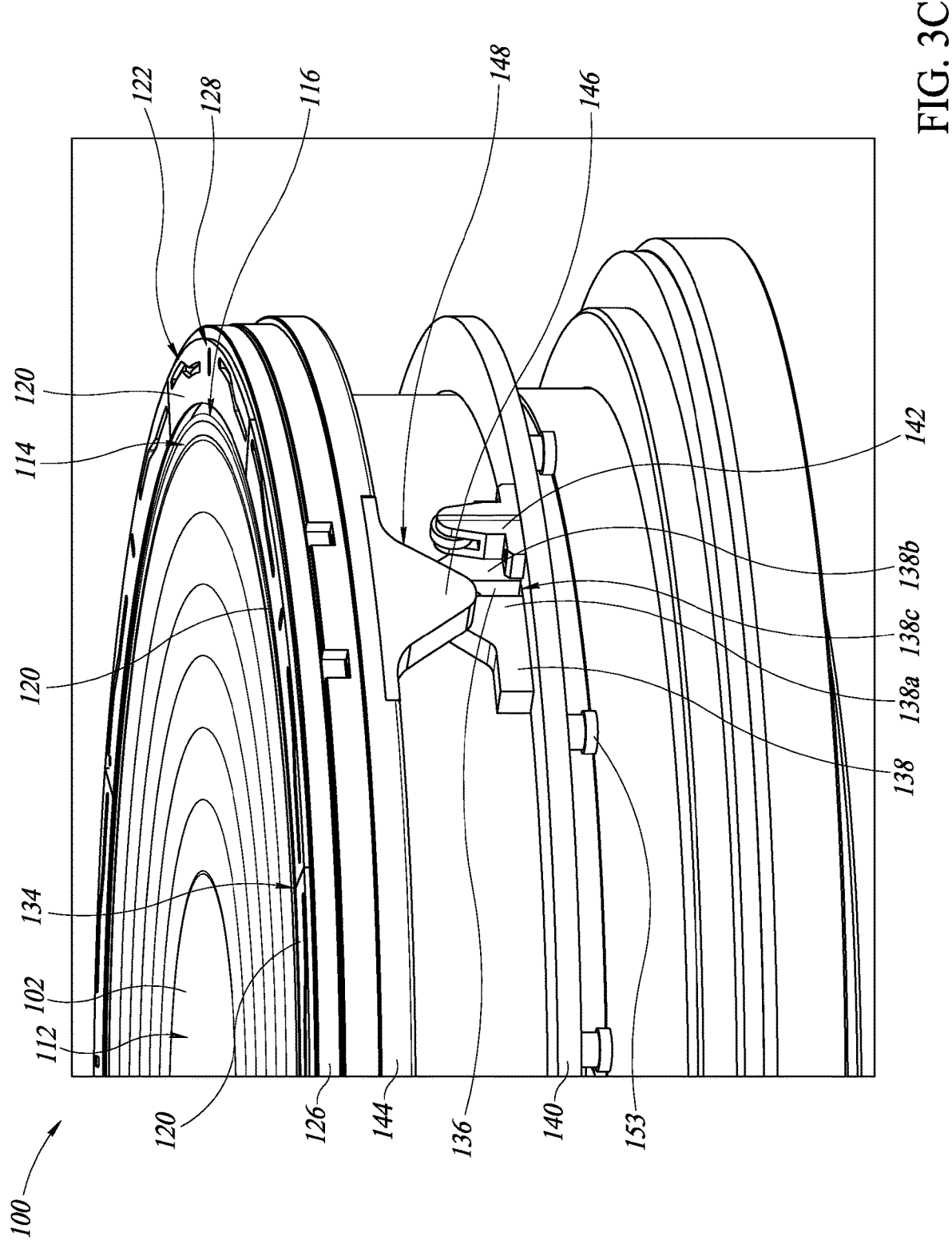
FIG. 3C is a perspective view of the embodiment of the record or vinyl playback device as shown in FIGS. 1A and 1B with some respective components hidden such that internal components are visible, and in which the peripheral clamp is in the clamped position.

FIG. 3C is a perspective view of the embodiment of the record or vinyl playback device 100 as shown in FIGS. 1A and 1B with some respective components hidden such that internal components are visible, and in which the peripheral clamp 108 is in the clamped position. FIG. 3C corresponds to FIG. 2D in that FIG. 3C shows the peripheral clamp 108 in the clamped position as shown in FIG. 2D in which the clamp structures 120 are mechanically engaged with the peripheral surface 114 of the record 102, the edge 116 of the record 102, or both.

FIG. 4A is a simplified side cross-sectional view of the embodiment of the record or vinyl playback device 100 as shown in FIGS. 1A and 1B when the peripheral clamp 108 is in the unclamped position. FIG. 4A corresponds to FIG. 2A in that FIG. 4A shows the peripheral clamp 108 in the unclamped position as shown in FIG. 2A in which the peripheral clamp 108 is within the housing 106. As shown in FIG. 4A, the rod 136 is in a lowered state as the peripheral clamp 108 is in the unclamped position and is housed within the housing 106, and the wheel structure 142 is on the left-hand side of the curved protrusion 146. In FIG. 4A, the lower rotation structure actuation device 156 is in a compressed state as the peripheral clamp 108 is in the unclamped position. The lower rotation structure actuation device 156 is in mechanical engagement with the lower rotation structure 140 by an interconnect structure 157 that protrudes from a side of the lower rotation structure 140 opposite to a side of the lower rotation structure 140 from which the wheel structure 142 and the translating structure 138 protrude. In operation, the lower rotation structure actuation device 156 is expanded to an expanded state (see FIG. 4C of the present disclosure) from the compressed state to move the peripheral clamp 108 from the unclamped position to the clamped position, and the lower rotation structure actuation device 156 is compressed from the expanded state from the compressed state to move the peripheral clamp 108 from the clamped position to the unclamped position.

FIG. 4B is a simplified cross-sectional view of the embodiment of the record or vinyl playback device 100 as shown in FIGS. 1A and 1B when the peripheral clamp 108 is in the intermediate position. FIG. 4B corresponds to FIGS. 2B and 2C in that FIG. 4B shows the peripheral clamp 108 in the intermediate position as shown in FIGS. 2B and 2C between the unclamped position and the clamped position. As shown in FIG. 4B, the wheel structure 142 is close to the apex of the curved protrusion 146 along the curved surface 148 such that the rod 136 is at a fully raised or lifted position. When the wheel structure 142 is at the apex of the curved protrusion 146 along the curved surface 148, the rod 136 will be in a fully raised state relative to the lowered state of the rod 136 as shown in FIG. 4A. When the rod 136 is in the fully raised state, an end 136a of the rod 136 is still present within the rod slot 138c between the first and second portions 138a, 138b, respectively, of the translating structure 138. When the rod 136 is in the almost fully raised state as shown in FIG. 4A, the clamp structures 120 of the peripheral clamp 108 are higher than the upper surface of the record 102. The clamp structures 120 being higher than the upper surface of the record 102 in the intermediate position as shown in FIG. 4A provides enough clearance for the clamp structures 120 to be actuated in the inward direction represented by the arrow 150 such that the clamp structures 120 are actuated inward enough to overlap the peripheral surface 114 of the record 102, the edge 116 of the record 102, or both. As shown in FIG. 4B, the lower rotation structure actuation device 156 is in a partially expanded state between the compressed state (see FIG. 4A of the present disclosure) and the expanded state (see FIG. 4C of the present disclosure) such that the peripheral clamp 108 is in the intermediate position between the unclamped position (see FIG. 4A of the present disclosure) and the clamped position (see FIG. 4C of the present disclosure).

FIG. 4C is a simplified cross-sectional view of the embodiment of the record or vinyl playback device 100 as shown in FIGS. 1A and 1B when the peripheral clamp 108 is in the clamped position. FIG. 4C corresponds to FIG. 2D in that FIG. 4C shows the peripheral clamp 108 in the clamped position as shown in FIG. 2D in which the clamp structures 120 are mechanically engaged with the peripheral surface 114 of the record 102, the edge 116 of the record 102, or both. As shown in FIG. 4C, the respective lower surfaces of the clamp structures 120 are mechanically engaged with the peripheral surface 114 of the record 102, the edge 116 of the record 102, or both. In other words, the clamp structures 120 are mechanically engaged and clamped onto the record 102 to maintain the flatness of the record 102 when playing the record 102 utilizing the playback device 100. As shown in FIG. 4C, the rod 136 is slightly lower than the almost fully raised position as shown in FIG. 4B and is slightly higher than the fully lowered position as shown in FIG. 4A. Once the clamp structures 120 of the peripheral clamp 108 are in mechanical engagement with the record 102, the wheel structure 142 is no longer in mechanical engagement with the lift structure 144 and is on the right-hand side of the curved protrusion 146. As shown in FIG. 4C, the lower rotation structure actuation device 156 is in the expanded state such that the peripheral clamp 108 is in the clamped position and the clamp structures 120 are in mechanical engagement with the record 102.

FIGS. 4A-4C show the lower rotation structure actuation device 156 actuating the lower rotation structure 140 by expanding the lower rotation structure actuation device 156 to the expanded state to move the peripheral clamp 108 from the unclamped position to the clamped position. This process may be reversed by compressing the lower rotation structure actuation device 156 from the expanded state to the compressed state to move the peripheral clamp 108 from the clamped position to the unclamped position. In other words, the reverse process would proceed successively with FIG. 4C, FIG. 4B, and then FIG. 4A.

Figure 5A:
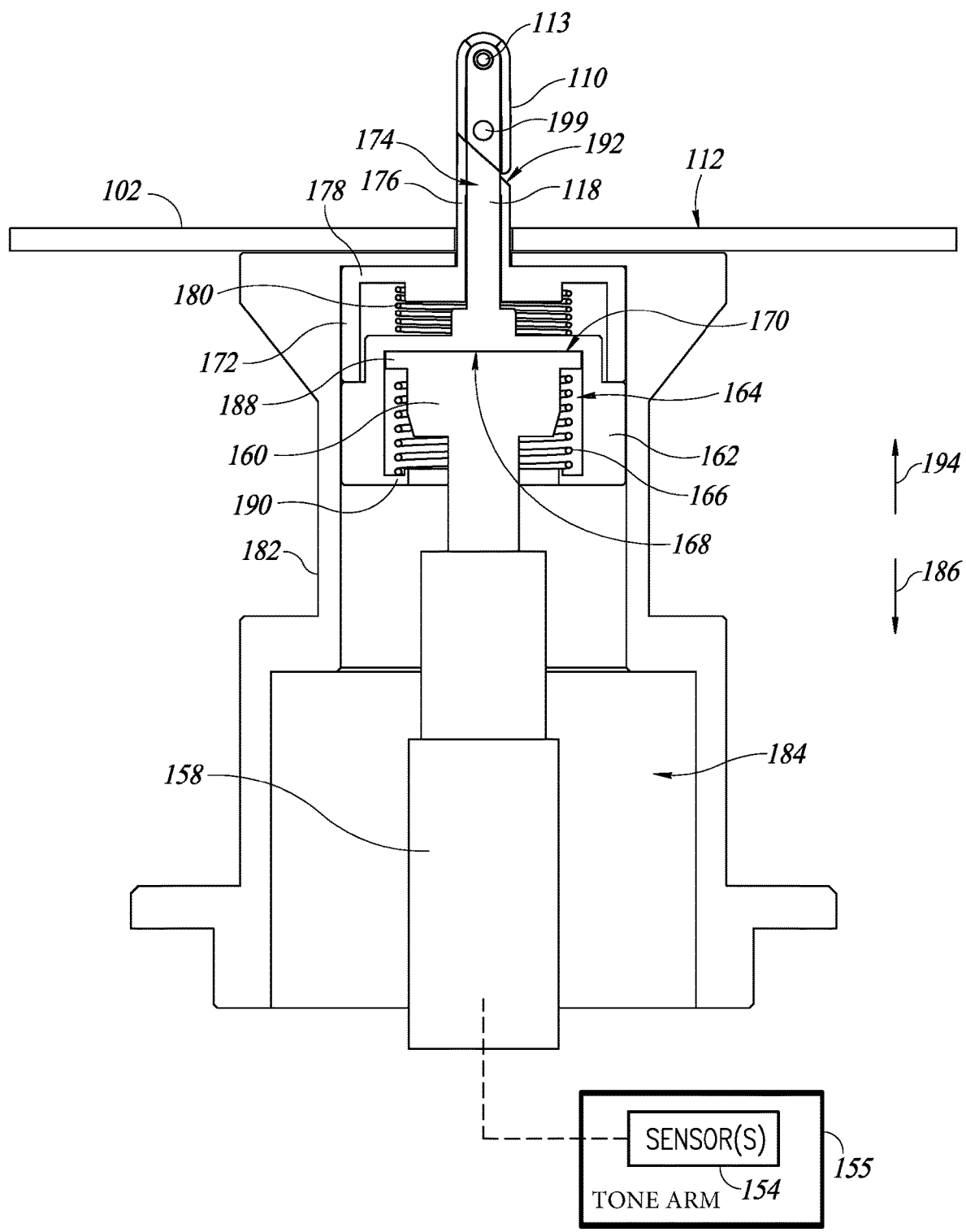
FIG. 5A is a side view of the spindle clamp of the embodiment of the record or vinyl playback device as shown in FIG. 1A in which portions of the spindle clamp are hidden and in which the spindle clamp is in the retracted position.

FIG. 5A is a side view of the spindle clamp 104 of the embodiment of the record or vinyl playback device 100 as shown in FIG. 1A in which portions of the spindle clamp 104 are hidden and in which the spindle clamp 104 is in the retracted position. The hidden portions of the spindle clamp 104 allow for internal components of the spindle clamp 104 to be readily visible in FIGS. 5A-5C. In FIG. 5A, the spindle clamp 104 is in the raised position corresponding to the raised position as shown in FIG. 1A of the present disclosure.

The spindle clamp 104 includes a piston device 158, which may be an electromagnetic piston. The piston device 158 is in electrical communication with the one or more sensors 154. The piston device 158 includes a piston head 160. Actuation of the piston device 158 may be initiated to actuate the spindle clamp arms 110 from the retracted position to the extended position when the one or more sensors 154 (see FIGS. 4A-4C and 5A-5C of the present disclosure) determines or detects that the tone arm 155 (see FIGS. 4A-4C and 5A-5C of the present disclosure) of the playback device 100 is being moved to bring the stylus in contact with the record 102 to playback music stored on the record 102.

A base 162 is coupled to the shaft 118. For example, the base 162 may be integral with the shaft 118 such that the base 162 and the shaft 118 are made of a single, continuous material. The base 162 and the shaft 118 may be referred to as a shaft structure 118, 162. The base 162 includes a base cavity 164, and the base cavity 164 contains the piston head 160 and a first spring 166. An internal surface 168 of the base 162 that delimits the base cavity 164 is in mechanical engagement with a surface 170 of the piston head 160. The first spring 166 may be biased towards the raised position as shown in FIGS. 1A and 5A.

A spindle clamp arm guide structure 172 includes a shaft opening 174 that extends through a first portion 176, which may be referred to as a spindle clamp arm guide portion, and a second portion 178 that is coupled to the first portion 176. The first and second portions 176, 178 may be integral with each other such that the first and second portions 176, 178 are made of a single, continuous material. The shaft 118 extends through the shaft opening 174 such that the spindle clamp arms 110 are above the first portion 176 and are outside the shaft opening 174 of the first portion 176. A second spring 180 is between the second portion 178 of the spindle clamp arm guide structure 172 and the base 162 of the shaft structure 118, 162.

A spindle clamp housing 182 of the spindle clamp 104 includes a cavity 184. As shown in FIG. 5A, when the piston device 158 has the piston head 160 in the expanded state, the cavity 184 of the spindle clamp housing 182 contains the piston device 158, the base 162 of the shaft structure 118, 162, second portion 178 of the spindle clamp arm guide structure 172, the first spring 166, and the second spring 180. The spindle clamp housing 182 may be contained within the housing 106 of the playback device 100. When the piston head 160 is in the fully expanded state as shown in FIG. 5A, the second spring 180 may be fully compressed and the first spring 166 may be fully extended.

Magnets 199 are present at, on, or in the spindle clamp arms 110 such that each spindle clamp arm 110 includes a magnet 199. For example, the magnets 199 at opposite ones of the spindle clamp arms 110 may be opposite to each other about the shaft 118 (e.g., on opposite sides of the shaft 118) or the pivot 113 (e.g., opposite sides of the pivot 113). The opposite ones of the magnets 199 are oppositely charged from each other (e.g., a first one may be negatively charged and the second one may be positively charged or vice versa) such that opposite ones of the magnets 199 are magnetically attracted to each other. This magnetic attraction between opposite ones of the magnets 199 at opposite ones of the spindle clamp arms 110 results in the magnets being magnetically attracted to each other even though the opposite ones of the magnets 199 are spaced apart by the shaft 118 or the pivot 113. This magnetic attraction or force between the magnets 199 maintains the spindle clamp arms 110 in a fully and completely retracted position or state as shown in FIGS. 1A and 5A of the present disclosure. The spindle clamp arms 110 are maintained in the fully and completely retracted position or state as shown in FIGS. 1A and 5A as the magnetic attraction between the magnets 199 results in the magnets 199 lining up with each other and magnetically retaining and maintaining the spindle clamp arms 110 in the fully and completely retracted position or state. The magnets 199 are magnetically strong enough such that the spindle clamp arms 110 are maintained in the fully and completely retracted position or state even when respective portions of the shaft 118, the pivot 113, and the spindle clamp arms 110 are physically between opposite ones of the magnets 199. The magnets 199 may be referred to as retention magnets, spindle clamp arm retention magnets, or to some other suitable reference to refer to the magnets 199.

These magnets 199 result in the spindle clamp arms 110 fully collapsing and being within the fully and retracted position or state as shown in FIGS. 1A and 5A. This fully retracted position or state of the spindle clamp arms 110 maintained by the magnets 199 allows for the record 102 to be slid onto and off of the spindle clamp 104 utilizing the opening 102 in the record 102 without the record 102 catching on the spindle clamp arms 110 of the spindle clamp 104. This reduced likelihood or prevention of catching of the record 102 on the spindle clamp arms 110 when in the fully and completely retracted position or state may reduce the likelihood or prevent damage to the record 102 through repeated use of the playback device 100 and provide a better user experience in utilizing the playback device 100 to play audio stored on the record 102. In other words, the magnets 199 result in the spindle clamp arms 110 not obstructing the record 102 from being slid onto and off of the spindle clamp 104.

The magnets 199 may be at, on, or in respective inner surfaces of the spindle clamp arms 110 that are directly adjacent or abuts a respective surface of the shaft 118 when in the spindle clamp arms 110 are in the retracted position or state. For example, as shown in FIG. 1A, the magnets 199 are at, on, or in the respective inner surfaces of the spindle clamp arms 110.

Figure 5B:
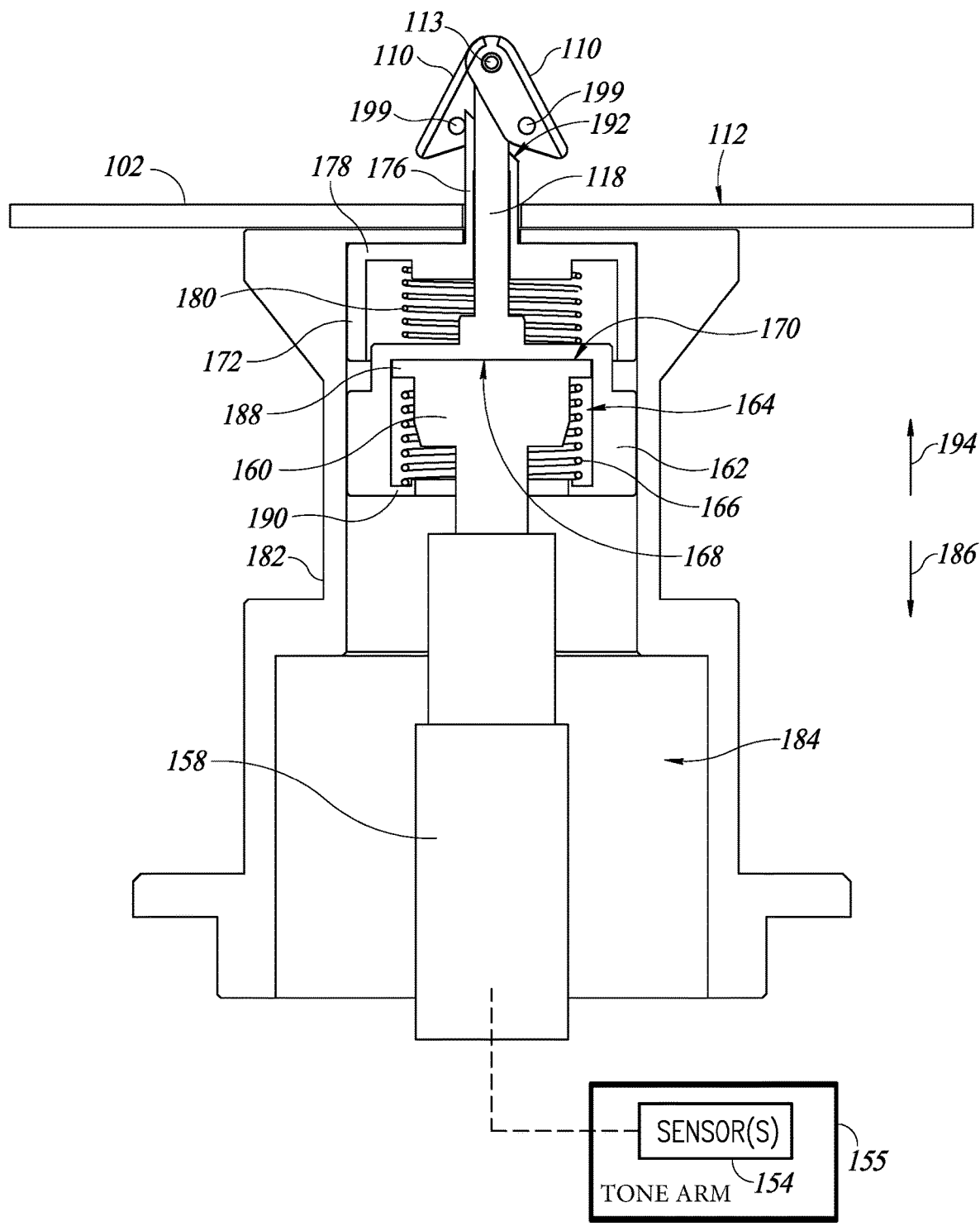
FIG. 5B is a side view of the spindle clamp of the embodiment of the record or vinyl playback device as shown in FIGS. 1A and 1B in which portions of the spindle clamp are hidden and in which the spindle clamp is in an intermediate position between the retracted position and the extended position as shown in FIGS. 1A and 1B, respectively.
Figure 5C:
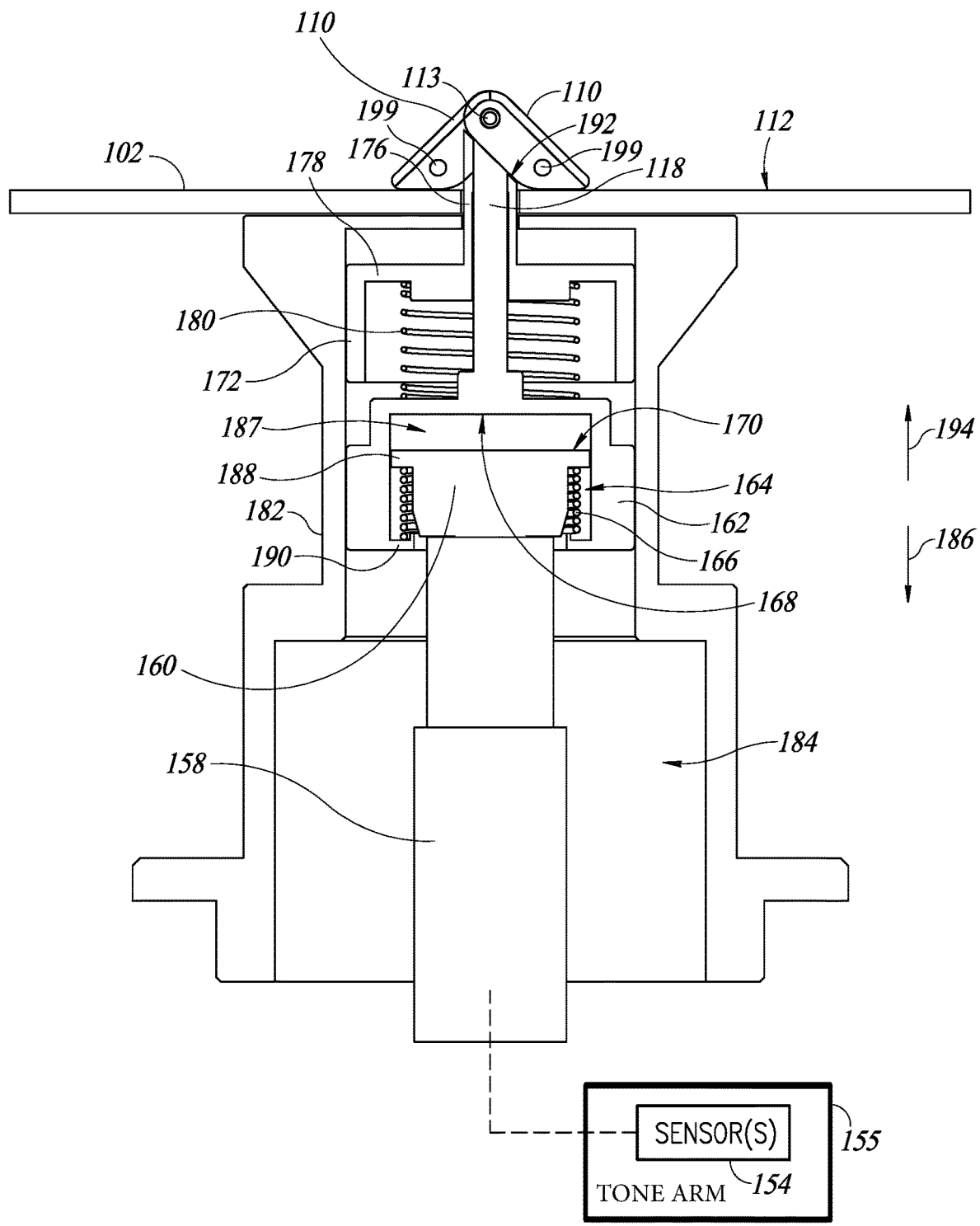
FIG. 5C is a cross-sectional view of the spindle clamp of the embodiment of the record or vinyl playback device as shown in FIG. 1B in which portions of the spindle clamp are hidden and in which the spindle clamp is in the extended position.

In FIGS. 5A-5C, respective portions of the spindle clamp arm guide structure 172 and the base 162 are hidden such that internal components of the spindle clamp 104 are more readily visible. For example, the respective portions of the spindle clamp arm guide structure 172 and the base 162 are hidden such that the shaft 118, the first spring 166, the second spring 180, and the piston is more readily visible. In FIGS. 5A-5C, a portion of the spindle clamp housing 182 may be hidden such that internal components of the spindle clamp 104 are more readily visible. For example, the portion of the housing 172 may be hidden such that the electromagnetic piston 158 is readily visible. These respective portions of the spindle clamp arm guide structure 172, the base 162, and the spindle clamp housing 182 provides visibility to internal workings of the spindle clamp 104 in operation as shown in FIGS. 5A-5C.

In view of the above discussion, in a method of operation of the spindle clamp 104 as shown in FIGS. 5A-5C of the present disclosure, the record 102 is initially placed on the record platter 103 such that the spindle clamp 104 is present within the opening at the center of the record 102. Once the record 102 is on the record platter 103 and the spindle clamp 104 is present within the opening at the center of the record 102, the spindle clamp 104 is actuated from the retracted position as shown in FIG. 5A to the extended position as shown in FIG. 5C. For example, actuating the spindle clamp 104 from the retracted position to the extended position may be initiated when the one or more sensors 154 (see FIGS. 4A-4C and 5A-5C of the present disclosure) determines or detects that the tone arm 155 (see FIGS. 4A-4AC and 5A-5C of the present disclosure) of the playback device 100 is being moved to bring the stylus in contact with the record 102 to playback music stored on the record 102. Once actuation of the spindle clamp 104 is initiated, the piston device 158 begins to actuate the piston head 160 in a downward direction as represented by an arrow 186.

As the piston head 160 moves downward, a first lip portion 188 at a peripheral region applies a downward force or pressure on the first spring 166. The downward force or pressure by the piston head 160 is transferred to a second lip portion 190 of the base 162 through the first spring 166. The transferring of the downward force or pressure of the piston head 160 to the second lip portion 190 of the base 162 through the first spring 166 may reduce the likelihood or may prevent the second lip portion 190 from breaking. As the piston head 160 moves in the downward direction represented by the arrow 186, the shaft 118 and the base 162 of the shaft structure 118, 162 begin to move in the downward direction represented by the arrow 186 (see FIG. 5B in which the piston head 160 is in an intermediate position, and see FIG. 5C in which the piston head 160 is in a fully retracted position). As the piston head 160 continues to move in the downward direction represented by the arrow 186, the first spring 166 is eventually compressed (see FIG. 5C) due to the piston head 160 continually moving downward and the base 162 catching on a portion or a structure of the piston device 158. The compression of the first spring 166 as shown in FIG. 5C results in a gap 187 between the internal surface 168 of the base 162 and the surface 170 of the piston head 160.

As the piston head 160 moves in the downward direction represented by the arrow 186, the second spring 180 begins to extend away from being compressed. In other words, the second spring 180 beings to expand and extend as the piston head 160 moves in the downward direction represented by the arrow 186. As the second spring 180 beings to extend and expand, the spindle clamp arm guide structure 172 is maintained in the same position at least for some period of the piston head 160 moving from the fully expanded state (see FIG. 5A of the present disclosure) to the fully compressed state (see FIG. 5C of the present disclosure). Maintaining the position of the spindle clamp arm guide structure 172 as the shaft 118 moves in the downward direction represented by the arrow 186 results in an inclined catch surface 192 at the end of the first portion 176 of the spindle clamp arm guide structure 172 pushing against the spindle clamp arms 110 resulting in the spindle clamp arms 110 rotating outwards and away from the retracted position (see FIG. 5A of the present disclosure) to the extended position (see FIG. 5C of the present disclosure) as the spindle clamp arms 110 move in the downward direction represented by the arrow 186 along with the shaft 118. The spindle clamp arms 110 push against the inclined catch surface 192 due to the second spring 180 maintaining the position of the spindle clamp arm guide structure 172 at least for some period of the piston head 160 moving from the fully expanded state (see FIG. 5A of the present disclosure) to the fully compressed state (see FIG. 5B of the present disclosure). The spindle clamp arms 110 pushing against the inclined catch surface 192 results in the spindle clamp arms 110 beginning to rotate outwards as shown in FIG. 5B from the retracted state as shown in FIG. 5A in which the spindle clamp is in the retracted position. At the point at which the spindle clamp arms 110 begin to rotate outwards the inclined catch surface 192 has applied enough force to the spindle clamp arms 110 such that the magnetic attraction between opposite ones of the magnets 199 at opposite ones of the spindle clamp arms 110 is overcome. This allows the spindle clamp arms 110 to move from the retracted state to an intermediate state between the retracted state of the spindle clamp arms 110 as shown in FIG. 5A and the extended state of the spindle clamp arms 110 as shown in FIG. 5C. The spindle clamp 104 is in an intermediate position between the retracted position (see FIGS. 1A and 5A of the present disclosure) and the extended position (see FIGS. 1B and 5C of the present disclosure). Once the second spring 180 is fully extended, the spindle clamp arm guide structure 172 moves in the downward direction represented by the arrow 186 and the spindle clamp arms 110 pull downwards on the spindle clamp arm guide structure 172 as the piston head 160 continues to move in the downwards direction represented by the arrow 186. Once the piston head 160 reaches the fully compressed state as shown in FIG. 5C, the spindle clamp arms 110 are fully in the extended state such that the spindle clamp 104 is in the extended position and the respective ends of the spindle clamp arms 110 are mechanically engaged with the central surface 112 of the record 102 to maintain the flatness of the record 102 when playing music on the record 102 utilizing the playback device 100.

In view of the above discussion with respect to FIGS. 5A-5C of moving the spindle clamp 104 from the retracted position to the extended position, this process may be reversed to move the spindle clamp 104 from the extended position to the retracted position by moving the piston head 160 in an upwards direction represented by an arrow 194 when the spindle clamp 104 is present in the extended position as shown in FIG. 5C. When the reverse process is carried out to move the spindle clamp 104 from the extended position to the retracted position, the spindle clamp arms 110 rotate inward along the inclined catch surface 192 as shown in FIGS. 5A-5C, and the process starts at FIG. 5C and ends up at FIG. 5A by passing through the intermediate position as shown in FIG. 5B. In this reverse process of moving the spindle clamp 104 from the extended position to the retracted position, the first spring 166 is extended and the second spring 180 is compressed (see FIG. 5A of the present disclosure). However, for the sake of simplicity and brevity of the present disclosure, further discussion of reversing the above process to move the spindle clamp 104 from the extended position to the retracted position will not be discussed in detail herein as it will be readily appreciated how the components of the spindle clamp 104 will work together to move the spindle clamp 104 from the extended position to the retracted position.

For example, actuating of the peripheral clamp 108 from the clamped position to the unclamped position may be initiated or triggered when one or more sensors 154 (see FIGS. 4A-4C and 5A-5C of the present disclosure) determines or detects that the stylus at the end of the tone arm 155 (see FIGS. 4A-4C and 5A-5C of the present disclosure) of the playback device 100 is being moved away from the record platter 103 or when the one or more sensors 154 detects the stylus at the end of the tonearm 154 is no longer over the record platter 103. For example, actuating of the spindle clamp 104 from the extended position to the retracted position may be initiated or triggered when one or more sensors 154 (see FIGS. 4A-4C and 5A-5C of the present disclosure) determines or detects that the stylus at the end of the tone arm 155 (see FIGS. 4A-4C and 5A-5C of the present disclosure) of the playback device 100 is being moved away from the record platter 103 or when the one or more sensors 154 detects the stylus at the end of the tonearm 154 is no longer over the record platter 103. In some embodiments of the playback device 100, there may be other respective sensors that may be present within the playback device 100 that may be utilized in controlling the mechanically engagement and disengagement of the spindle clamp 104 and the peripheral clamp 108 with the record 102 when present on the record platter 103.

While in the embodiments of the spindle clamp 104 as shown in the present disclosure includes a pair of spindle clamp arms 110 and includes a pair of magnets 199. In some other embodiments, there may be a different number of spindle clamp arms 110 than the pair of spindle clamp arms 110 as shown in the playback device 100. For example, in some embodiments, there may be single spindle clamp arm 110, and, in some embodiments, there may be more than two spindle clamp arms 110 (e.g., three (3), four (4), five (5), etc.).

In controlling the spindle clamp 104 and the peripheral clamp 108, the one or more sensors 154 may send signals to one or more switches that are in electrical communication with the lower rotation structure actuation device 156 and the piston device 158, respectively, to switch "on" and "off" the lower rotation structure actuation device 156 and the piston device 158.

While operation of the spindle clamp 104 and the peripheral clamp 108 are discussed separately above in the present disclosure above, it will be readily appreciated that the operation of the spindle clamp 104 and the peripheral clamp 108 occurs substantially simultaneously or concurrently with each other such that the spindle clamp 104 and the peripheral clamp 108 mechanically engage with the record 102 at the same time to maintain the flatness of the record 102 when present on the playback device 100. In other words, the spindle clamp 104 provides support to the central region of the record 102 at the same time the peripheral clamp 108 provides support to the peripheral region of the record 102 such that the intermediate region of the record 102 between the central region and the peripheral region remains flat when playing the record utilizing the playback device 100. Maintaining the flatness of the record 102 utilizing the spindle clamp 104 and the peripheral clamp 108 in combination with each other reduces the likelihood or prevents playback issues (e.g., skipping, jumping, distortion, etc.) of the record when utilizing the playback device 100. In other words, the increased flatness of the record 102 due to the mechanical engagement with the spindle clamp 104 and the peripheral clamp 108 when playing the record 102 utilizing the playback device 100 improves a contact between the stylus at the end of the tone arm 155 of the playback device 100 when playing the record 102 utilizing the playback device 100. At least one embodiment of a playback device of the present disclosure may be summarized as including: a record platter including a central region and a peripheral region; a record spindle at the central region of the record platter, the record spindle including a spindle clamp having a retracted position and an extended position; and a peripheral clamp at the peripheral region of the record platter, the peripheral clamp including a clamped position and an unclamped position.

When the spindle clamp is in the extended position, the spindle clamp may mechanically engage with a central region of a record present on the record platter; and when the peripheral clamp is in the clamped position, the peripheral clamp may mechanically engage with a peripheral region of the record present on the record platter.

The spindle clamp may include: a shaft; and a spindle clamp arm that is coupled to the shaft, and, when the spindle clamp is in the extended position, the spindle clamp arm mechanically engages with a central region of a record present on the record platter.

The spindle clamp arm may be rotationally coupled to the shaft, and the spindle clamp arm may rotationally move between the retracted position and the extended position.

The spindle clamp may further include a guide structure including an opening in which the shaft is received, the guide structure may include a guide end that mechanically engages with an end of the spindle clamp arm to rotate the spindle clamp arm between mechanical engagement and mechanical disengagement with the central region of the record.

The playback device may further include an electromagnetic piston that actuates the shaft between a lifted position and a lowered position.

The shaft may include a lifted position and a lowered position.

When the peripheral clamp is in the clamped position and the spindle clamp is in the extended position, the shaft of the spindle clamp may be in the lowered position; and when the peripheral clamp is in the unclamped position and the spindle clamp is in the retracted position, the shaft of the spindle clamp may be in the lifted position.

When the peripheral clamp is in the unclamped position, the spindle clamp may be in the retracted position, and the shaft of the spindle clamp may be in the lifted position, the spindle clamp arm may be mechanically disengaged from the record.

The peripheral clamp may include: a clamp structure including a guide pathway that extends through the clamp structure; a lift structure underlying the clamp structure, the lift structure including: a guide pin that protrudes towards the clamp structure, the guide pin is in the guide pathway, and is in mechanical engagement with the clamp structure through the guide pathway; a guide shaft that protrudes away from the clamp structure; and a lift protrusion that protrudes away from the clamp structure; a rotational structure underlying the lift structure, the rotational structure may include: a guide structure that protrudes towards the lift structure, the guide structure includes an opening in which the guide shaft is present, and the guide structure is in mechanical engagement with the guide shaft through the opening; and a wheel structure that protrudes towards the lift structure, the wheel structure including a wheel that mechanically engages with the lift protrusion.

The clamp structure of the peripheral clamp may mechanically engage with a record present on the record platter when the peripheral clamp is in the clamped position; and the clamp structure of the peripheral clamp may mechanically disengage with the record present on the record platter when the peripheral clamp is in the unclamped position.

The rotational structure may be rotationally moveable between a first position on a first side of the lift protrusion and a second position on a second side of the lift protrusion opposite to the first side.

The lift protrusion may include a curved surface; and when the rotation structure is moved between the first position and the second position, the wheel structure may mechanically engage with the curved surface of the lift protrusion to move the peripheral clamp between the clamped position and the unclamped position.

At least one embodiment of a method of the present disclosure may be summarized as including: placing a record on a record platter by positioning a record spindle in an opening of the record; moving a shaft of the record spindle from a lifted position to a lowered position and moving a spindle clamp arm of the record spindle from a retracted position to an extended position mechanically engaging a central region of the record with the spindle clamp arm; and moving a clamp structure of a peripheral clamp from an unclamped position to a clamped position mechanically engaging a peripheral region of the record with the clamp structure.

Moving the shaft from the lifted position to the lowered position and moving the spindle clamp arm of the record spindle from a retracted position to the extended position may include actuating an electromagnetic piston.

Actuating the electromagnetic piston to move the shaft from the lifted position to the lowered position and to move the spindle clamp arm of the record spindle from the retracted position to the extended position may include moving a piston head of the electromagnetic piston from an extended position to a retracted position Moving the piston head from the extended position to the retracted position may include compressing a spring in mechanical engagement with the piston head.

At least one embodiment of a playback device may be summarized as including: a record platter including a central region and an opening at the central region; an electromagnetic piston at the central region, the electromagnetic piston including a piston head; and a spindle clamp including: a shaft structure including: a base that receives the piston head; a shaft that has a first end coupled to the base and a second end opposite to the first end, the shaft protrudes from the base, extends from the first end, and passes through the opening to the second end; a first position; and a second position a spindle clamp arm that is rotationally coupled to the second end of the shaft, the spindle clamp arm includes an extended position and a retracted position; and a spindle clamp arm guide structure that includes an opening that receives the shaft, the spindle clamp arm guide structure mechanically engages with the spindle clamp arm to move the spindle clamp arm between the retracted position and the extended position when the shaft structure is moved between the first position and the second position.

The shaft structure may be moved between the first position and the second position by the piston head of the electromagnetic piston.

The playback device may further include: a first spring within the base of the shaft structure, the first spring is between the base of the shaft structure and piston head of the electromagnetic piston; and a second spring between the base of the shaft structure and the spindle clamp arm guide structure.

The spindle clamp arm includes a retention magnet configured to retain the spindle clamp arm in a fully and completely retracted state when in the retracted position.

The spindle clamp arm may be a first one of a plurality of spindle clamp arms; and the retention magnet may be a first one of a plurality of retention magnets, and each one of the plurality of retention magnets is at a corresponding one of the plurality of spindle clamp arms.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A playback device, comprising:
a record platter including a central region and a peripheral region;
a record spindle at the central region of the record platter, the record spindle including a spindle clamp having a retracted position and an extended position, the spindle clamp comprising:
a shaft configured to be placed in a lifted position and a lowered position; and
a spindle clamp arm that is coupled to the shaft, and, when the spindle clamp is in the extended position, the spindle clamp arm mechanically engages with a central region of a record present on the record platter, wherein the spindle clamp arm is rotationally coupled to the shaft, and wherein the spindle clamp arm rotationally moves between the retracted position and the extended position; and
a clamp structure arranged within a housing of the playback device, the clamp structure configured to actuate a peripheral clamp at the peripheral region of the record platter, the peripheral clamp including a clamped position and an unclamped position,
wherein:
when the spindle clamp is in the extended position, the spindle clamp mechanically engages with a central region of a record present on the record platter;
when the peripheral clamp is in the clamped position, the peripheral clamp mechanically engages with a peripheral region of the record present on the record platter;
when the peripheral clamp is in the clamped position and the spindle clamp is in the extended position, the shaft of the spindle clamp is in the lowered position; and
when the peripheral clamp is in the unclamped position and the spindle clamp is in the retracted position, the shaft of the spindle clamp is in the lifted position.

2. The playback device of claim 1, wherein:
the spindle clamp further includes a guide structure including an opening in which the shaft is received, the guide structure including a guide end that mechanically engages with an end of the spindle clamp arm to rotate the spindle clamp arm between mechanical engagement and mechanical disengagement with the central region of the record.

3. The playback device of claim 1, further comprising an electromagnetic piston that actuates the shaft between a lifted position and a lowered position.

4. The playback device of claim 1, wherein:
when the peripheral clamp is in the unclamped position, the spindle clamp is in the retracted position, and the shaft of the spindle clamp is in the lifted position, the spindle clamp arm is mechanically disengaged from the record.

5. The playback device of claim 1, wherein the peripheral clamp includes:
the clamp structure including a guide pathway that extends through the clamp structure;
a lift structure underlying the clamp structure, the lift structure including:
a guide pin that protrudes towards the clamp structure, the guide pin is in the guide pathway, and is in mechanical engagement with the clamp structure through the guide pathway;
a guide shaft that protrudes away from the clamp structure; and
a lift protrusion that protrudes away from the clamp structure;
a rotational structure underlying the lift structure, the rotational structure including:
a guide structure that protrudes towards the lift structure, the guide structure includes an opening in which the guide shaft is present, and the guide structure is in mechanical engagement with the guide shaft through the opening; and a wheel structure that protrudes towards the lift structure, the wheel structure including a wheel that mechanically engages with the lift protrusion.

6. The playback device of claim 5, wherein:

the clamp structure of the peripheral clamp mechanically engages with a record present on the record platter when the peripheral clamp is in the clamped position; and the clamp structure of the peripheral clamp mechanically disengages with the record present on the record platter when the peripheral clamp is in the unclamped position.

7. The playback device of claim 6, wherein the rotational structure is rotationally moveable between a first position on a first side of the lift protrusion and a second position on a second side of the lift protrusion opposite to the first side.

8. The playback device of claim 7, wherein:

the lift protrusion includes a curved surface; and when the rotational structure is moved between the first position and the second position, the wheel structure mechanically engages with the curved surface of the lift protrusion to move the peripheral clamp between the clamped position and the unclamped position.

9. A playback device, comprising:

a record platter including a central region and a peripheral region;

a record spindle at the central region of the record platter, the record spindle including a spindle clamp having a retracted position and an extended position;

a peripheral clamp at the peripheral region of the record platter, the peripheral clamp including a clamped position and an unclamped position;

a clamp structure including a guide pathway that extends through the clamp structure; and a lift structure underlying the clamp structure, the lift structure including:

a guide pin that protrudes towards the clamp structure, the guide pin is in the guide pathway, and is in mechanical engagement with the clamp structure through the guide pathway;

a guide shaft that protrudes away from the clamp structure; and a lift protrusion that protrudes away from the clamp structure; and a rotational structure underlying the lift structure, the rotational structure including:

a guide structure that protrudes towards the lift structure, the guide structure includes an opening in which the guide shaft is present, and the guide structure is in mechanical engagement with the guide shaft through the opening; and a wheel structure that protrudes towards the lift structure, the wheel structure including a wheel that mechanically engages with the lift protrusion.

10. The playback device of claim 9, wherein:

the clamp structure of the peripheral clamp mechanically engages with a record present on the record platter when the peripheral clamp is in the clamped position; and the clamp structure of the peripheral clamp mechanically disengages with the record present on the record platter when the peripheral clamp is in the unclamped position.

11. The playback device of claim 10, wherein the rotational structure is rotationally moveable between a first position on a first side of the lift protrusion and a second position on a second side of the lift protrusion opposite to the first side.

12. The playback device of claim 11, wherein:

the lift protrusion includes a curved surface; and when the rotational structure is moved between the first position and the second position, the wheel structure mechanically engages with the curved surface of the lift protrusion to move the peripheral clamp between the clamped position and the unclamped position.

13. A playback device, comprising:

a record platter including a central region and a peripheral region;

a record spindle at the central region of the record platter, the record spindle including a spindle clamp having a retracted position and an extended position, the spindle clamp comprising:

a shaft; and a spindle clamp arm that is coupled to the shaft, and, when the spindle clamp is in the extended position, the spindle clamp arm mechanically engages with a central region of a record present on the record platter, wherein the spindle clamp arm is rotationally coupled to the shaft, and wherein the spindle clamp arm rotationally moves between the retracted position and the extended position;

an electromagnetic piston configured to actuate the shaft between a lifted position and a lowered position; and a clamp structure arranged within a housing of the playback device, the clamp structure configured to actuate a peripheral clamp at the peripheral region of the record platter, the peripheral clamp including a clamped position and an unclamped position, wherein:

when the spindle clamp is in the extended position, the spindle clamp mechanically engages with a central region of a record present on the record platter; and when the peripheral clamp is in the clamped position, the peripheral clamp mechanically engages with a peripheral region of the record present on the record platter.

* * * * *